(12) United States Patent
Hopkins

(10) Patent No.: US 6,930,627 B1
(45) Date of Patent: Aug. 16, 2005

(54) RADIO-FREQUENCY DIGITAL/ANALOG CONVERTER SYSTEM AND METHOD

(76) Inventor: Michael C. Hopkins, 1535 Dalehurst Ct., Tracy, CA (US) 95377-8274

(*) Notice: Subject to any disclaimer, the term of this patent is extended or adjusted under 35 U.S.C. 154(b) by 0 days.

(21) Appl. No.: 10/785,609

(22) Filed: Feb. 23, 2004

(51) Int. Cl.$^7$ ............................................. H03M 1/66
(52) U.S. Cl. ....................... 341/144; 375/145; 375/324; 342/171
(58) Field of Search .................. 342/171, 194; 375/145, 324, 222; 329/304; 341/144; 370/441; 455/76, 71, 16; 348/724

(56) References Cited

U.S. PATENT DOCUMENTS

| | | | |
|---|---|---|---|
| 4,344,188 A | | 8/1982 | Tanabe et al. ............... 455/326 |
| 4,450,447 A | * | 5/1984 | Zebker et al. ............... 342/171 |
| 4,481,490 A | | 11/1984 | Huntley ...................... 332/152 |
| 4,521,779 A | * | 6/1985 | Lewis ......................... 342/194 |
| 4,677,692 A | | 6/1987 | Sakashita et al. ........... 455/319 |
| 4,926,440 A | * | 5/1990 | Mikoshiba et al. ......... 375/145 |
| 5,162,763 A | | 11/1992 | Morris ........................ 332/170 |
| 5,172,079 A | | 12/1992 | Shigenari ................... 332/168 |
| 5,446,762 A | * | 8/1995 | Ohba et al. ................. 375/324 |
| 5,515,014 A | | 5/1996 | Troutman ................... 332/178 |

(Continued)

OTHER PUBLICATIONS

Microwaves & RF, A Penton Publication, www.plantee.com, Apr. 2004.
"Fast–Hopping DDS with Integrated 2.6 GHz PLL", Analog Devices, http://www.analog.com/Analog_Root/static/pdf/solutionsBulletins/SB–RF–06–04.pdf, Jun. 2004.
"AgileRF synthesizer", Analog Devices, http://www.analog-.com/analog_root/static/pdf/dataConverters/productHighlights/AD9956_4–04.pdf, (no date).
"RF Synthesizer Integrates DDS and PLL Functions", EE Porduct News, http://www.eepn.com/Locator/Products/ArticleID/30999/Action/Issue/30999.html, Dec. 2004.
"Analog Devices 2.7 GHz DDS–Based AgileRF Synthesizer AD9956", wwww.analog.com, Sep. 2004.

(Continued)

Primary Examiner—Jean Bruner Jeanglaude
(74) Attorney, Agent, or Firm—Zilka-Kotab, PC

(57) ABSTRACT

A radio frequency (RF) converter system and associated method are provided for generating and/or receiving RF signals. Included is a signal conversion circuit for digital signal processing (DSP) or converting between digital signals and analog signals. Further provided is a shifting circuit in communication with the signal conversion circuit. In transmit mode, the shifting circuit is adapted for at least one of frequency shifting and phase shifting the signals, as a function of either an oscillating signal or a baseband signal to generate modulated signals. Further included are a transmit/receive port and a termination circuit in communication with shifting circuit for transmitting the modulated signals and selecting a portion of the transmitted modulated signals, respectively. Still yet, an output filter or mixer may be provided. In receive mode, the shifting circuit is adapted for receiving a non-varying DC signal from the signal conversion circuit. This DC signal serves to nullify the oscillating signal applied to the shifting circuit and provide biasing for the termination circuit. The non-varying direct current (DC) signal is combined with the incoming modulated signals from the transmit/receive port and is applied to the termination circuit. The termination circuit is adapted for generating baseband signals as a function of the applied oscillating signal. In use, a frequency associated with the oscillating signal or baseband signal, a frequency associated with the termination circuit, a frequency corresponding to a clock associated with the signal conversion circuit, and a frequency associated with a master clock are integer multiples of each other.

71 Claims, 18 Drawing Sheets

U.S. PATENT DOCUMENTS

| | | | | |
|---|---|---|---|---|
| 5,722,040 | A | * | 2/1998 | Bjerede et al. ............... 455/76 |
| 5,825,242 | A | * | 10/1998 | Prodan et al. .............. 329/304 |
| 5,826,182 | A | | 10/1998 | Gilbert ...................... 455/326 |
| 5,872,810 | A | * | 2/1999 | Philips et al. ............... 375/222 |
| 6,002,923 | A | | 12/1999 | Sahlman .................... 455/118 |
| 6,054,889 | A | | 4/2000 | Kobayashi ................. 327/357 |
| 6,230,001 | B1 | | 5/2001 | Wyse ........................ 455/326 |
| 6,370,372 | B1 | | 4/2002 | Molnar et al. ............. 455/323 |
| 6,590,515 | B1 | | 7/2003 | Dacy et al. ................. 341/144 |
| 6,665,308 | B1 | * | 12/2003 | Rakib et al. ................ 370/441 |
| 6,701,133 | B1 | * | 3/2004 | Bennett et al. .............. 455/71 |
| 6,704,545 | B1 | * | 3/2004 | Wala .......................... 455/16 |
| 6,714,260 | B1 | * | 3/2004 | Pine ........................... 348/724 |
| 2002/0047793 | A1 | | 4/2002 | Eriksson et al. ........... 341/144 |

OTHER PUBLICATIONS

Technical Staff, "Alias and Spurious Responess in DDS Systems," Intel Corporation, Mar. 1990.

T. Manku, Wireless Microsystems "Virtual Lo Tunes Direct–Conversion Receivers," Microwaves & RF, Jan. 2000.

* cited by examiner

Figure II

RADIO-FREQUENCY DIGITAL/ANALOG CONVERTER SYSTEM AND METHOD

FIELD OF THE INVENTION

The present invention relates to circuitry, and more particularly to radio frequency (RF) circuits.

BACKGROUND OF THE INVENTION

The up conversion of digital baseband signals to RF frequency bands and the subsequent down conversion of these signals back to baseband cleanly and efficiently has always been the desired end product of modulation and demodulation systems.

Generally, traditional modulation/demodulation systems fall into 3 broad categories. The first are systems that are completely analog which incorporate a wide variety of passive and active mixers. Components in systems such as these range from passive diode and resistive mixers and summers to active, analog Gilbert cells. These systems require massive amounts of filtering (hardware intensive), are generally not power efficient, and are sensitive to noise and intermodulation distortion.

The second broad category of modulation/demodulation systems utilize low speed DACs and analog mixers for up conversion of digital baseband signals to RF frequency bands and subsequently utilize mixers and ADCs for down conversion of these signals back to baseband for digital processing. Although this system solution allows for digital control and processing of baseband signals, it still suffers from the same hardware, power, and distortion problems as the first category.

The third broad category of modulation/demodulation systems utilize high speed digital processing, high speed DACS, and high speed ADCs to directly convert digitally generated data to RF signals in transmitters and directly digitize incoming RF in receivers. Although this approach eliminates much of the hardware and resulting intermodulation distortion associated with the previously mentioned solutions, it introduces additional problems in that high speed DACs and ADCs are hard to design, expensive to fabricate, and the high speed circuitry composing these devices is power expensive.

All three presently employed modulation/demodulation methodologies are expensive in terms of power, hardware, and complexity.

The more hardware and power efficient modulation/demodulation systems can become, more digital functions can be incorporated into designs, and ultimately a wider diversity of products may be realized. With the advent and popularity of baseband digital signal processing in modulation/demodulation systems, the usefulness of circuit designs and methods that can directly digitally up convert digital data to RF frequency bands and easily demodulate incoming RF back to baseband for analog to digital conversion becomes clear.

DISCLOSURE OF THE INVENTION

A radio frequency (RF) converter system and associated method are provided for generating and/or receiving RF signals. Included is a signal conversion circuit for digital signal processing (DSP) or converting between digital signals and analog signals. Further provided is a shifting circuit in communication with the signal conversion circuit.

In transmit mode, the shifting circuit is adapted for at least one of frequency shifting and phase shifting the signals, as a function of either an oscillating signal or a baseband signal to generate modulated signals. Further included are a transmit/receive port and a termination circuit in communication with shifting circuit for transmitting the modulated signals and selecting a portion of the transmitted modulated signals, respectively. Still yet, an output filter or mixer may be provided.

In receive mode, the shifting circuit is adapted for receiving a non-varying DC signal from the signal conversion circuit. This DC signal serves to nullify the oscillating signal applied to the shifting circuit and provide biasing for the termination circuit. The non-varying direct current (DC) signal is combined with the incoming modulated signals from the transmit/receive port and is applied to the termination circuit. The termination circuit is adapted for generating baseband signals as a function of the applied oscillating signal.

In use, a frequency associated with the oscillating signal or baseband signal, a frequency associated with the termination circuit, a frequency corresponding to a clock associated with the signal conversion circuit, and a frequency associated with a master clock are integer multiples of each other.

DETAILED DESCRIPTION

Figure 1:
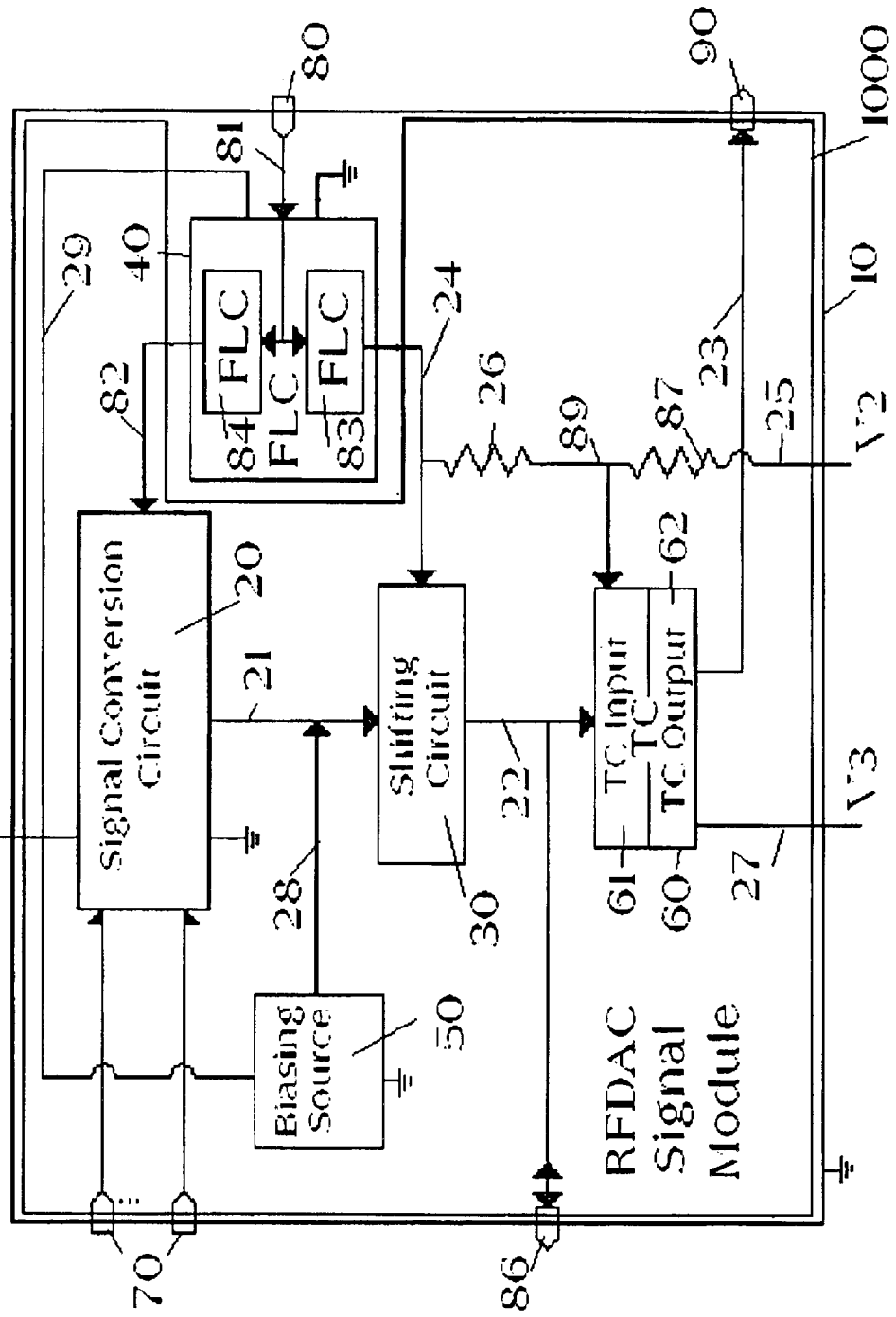
FIG. 1 details one embodiment of a radio frequency (RF) digital/analog converter (DAC), or RFDAC.

FIG. 1 details one embodiment of a radio frequency (RF) digital/analog converter (DAC), or RFDAC. The RFDAC 10 includes a signal module 1000, which includes a signal conversion circuit 20 (i.e. a baseband DAC, any other circuit capable of converting a signal, etc.), a frequency/phase shifting circuit 30 (i.e. a stacked current mode upconverter, any other circuit capable of shifting the frequency or phase of a signal, etc.), a frequency locking circuit 40, a biasing source 50, a termination circuit 60, a data or signal input port 70, a master clock input port 80, a transmit/receive input/output port 86, and an output port 90. Signal processing (once signal conversion is complete) is done in current mode (signal currents 21 and 22). The circuits (20, 30, and 60) may be stacked vertically between power supply rails for minimal power dissipation.

Essentially, the RFDAC 10 may operate as a transmitter or receiver, dependent on signals input to signal conversion circuit 20 and termination circuit 60.

In transmit mode, the signal conversion circuit 20, receives analog signals or digital data (dependent on the input circuit used) from port 70, and converts these signals to analog current 21, that is proportional to the signal inputs 70. This baseband current 21 is then passed directly to the frequency/phase shifting circuit 30, where it is processed as a function of an oscillating signal and/or a baseband signal. In one embodiment, the baseband current 21 is upconverted to RF frequency bands set by the frequency of the local oscillator 24. The local oscillating signals, 24 and 89, are made to "common mode" with supply voltage 25 and termination circuit input 61, or set to an offset voltage, through voltage translation circuit 26 and common mode circuit 87. Voltage translation circuit 26 and common mode circuit 87 may be a wire, resistor, or any active or passive device or devices that serve to dc translate ac signals. Supply voltage 25 is applied to termination circuit input 61, of termination circuit 60, and to voltage translation circuit 26, via common mode circuit 87. Supply voltage 25 is made to be adjustable or fixed to accommodate maximum linearity performance from signal conversion circuit 20. Biasing source 50 sets DC analog current 28 to accommodate maximum linearity from signal conversion circuit 20, frequency/phase shifting circuit 30, and termination circuit 60. Analog current 28 may be zero, but is nominally set equal to the full scale output current of the signal conversion circuit 20. Supply voltages 27 and 29 may be set to any level consistent with RFDAC circuit operation and termination circuit output 62 operation.

Supply voltage 25 may be set equal to supply voltage 27, which in this embodiment may be circuit ground. The modulated output current 22 of the frequency/phase shifting circuit 30 is then passed to transmit/receive, input/output port 86 and to output termination circuit [resistive or reactive (filter, active or passive mixer)] 60 for conversion to a modulated output signal 23.

The signal conversion circuit 20 can be any circuit that performs the conversion of analog signals or digital data to analog currents 21. The circuit may be any one or more of a digital signal processor (DSP), a digital to analog converter, and/or an analog to digital converter. It should be further noted that it does not necessarily need to be clocked.

The frequency/phase shifting circuit 30 receives baseband analog current 21 from the signal conversion circuit 20, and mixes these currents 21 with the local oscillating signal 24. The frequency/phase shifting circuit 30 may be any mixer type in which local oscillator 24 and baseband currents 21 are mixed.

The resultant mixed current signal 22 is then passed to transmit/receive, input/output port 86 and to termination circuit 60, in which the mixed signal current is converted to a terminal analog signal 23. This termination circuit 60 can take the form of a simple resistive termination, a frequency selective network, such as a filter, an antenna, or a local oscillator signal 89 driven active or passive mixer.

Usually, ranges of frequency spectrum or modulation envelopes are the desired outputs of the upconverter. In such cases, a passive output cavity resonator or saw filter, or a local oscillator signal 89 driven active or passive mixer are used as the termination circuit 60. The terminal signal 23 is then passed to output port 90.

In receive mode, the signal conversion circuit 20, is set via port 70, to output a DC current 21, which when combined with dc biasing current 28, serves to nullify the local oscillating signal 24 and bias frequency/phase shifting circuit 30 and termination circuit 60. RF signals are input at transmit/receive input/output port 86, are then combined with signal current 22, and presented to termination circuit input 61. Termination circuit 60 serves to process the incoming RF as a function of an oscillating signal 89 and outputs a baseband signal 23 which is output at port 90.

Figure 2:
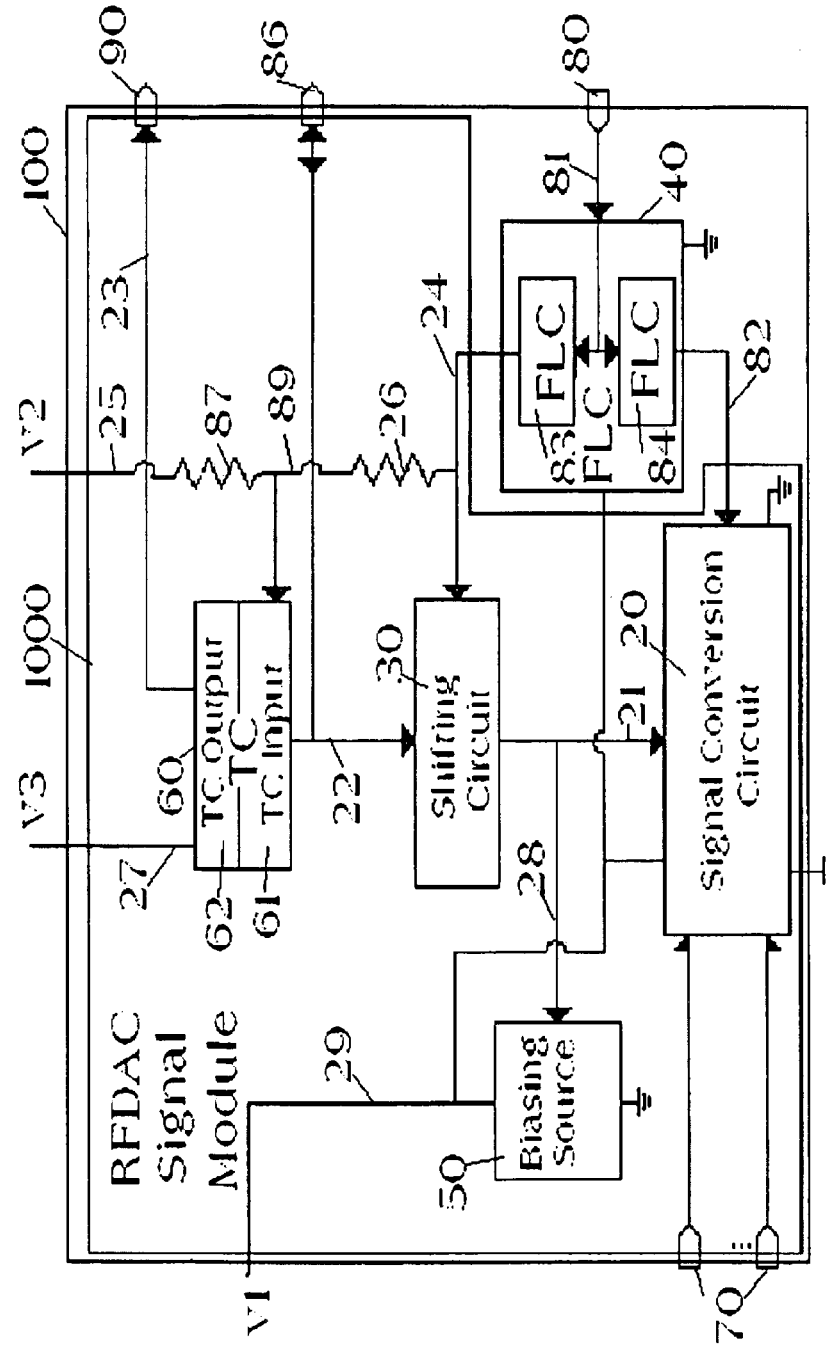
FIG. 2 illustrates another RFDAC embodiment, which is similar to RFDAC of FIG. 1, with like elements indicated by like reference numbers.

FIG. 2 illustrates another RFDAC embodiment 100, which is similar to RFDAC 10, with like elements indicated by like reference numbers. In the present embodiment 100, however, the signal currents 21, 22, and 28 are reversed in polarity with respect to the currents in RFDAC 10, and circuits 20, 26, 30, 40, 50, and 60 are accordingly reversed in polarity to accommodate said reversed polarity currents. Supply voltage 25 may be either set to the highest voltage in the system or may be set equal to supply voltage 29 (in this embodiment, it may not be grounded). Supply voltage 27 may be any level consistent with termination circuit output 62 operation.

Figure 3:
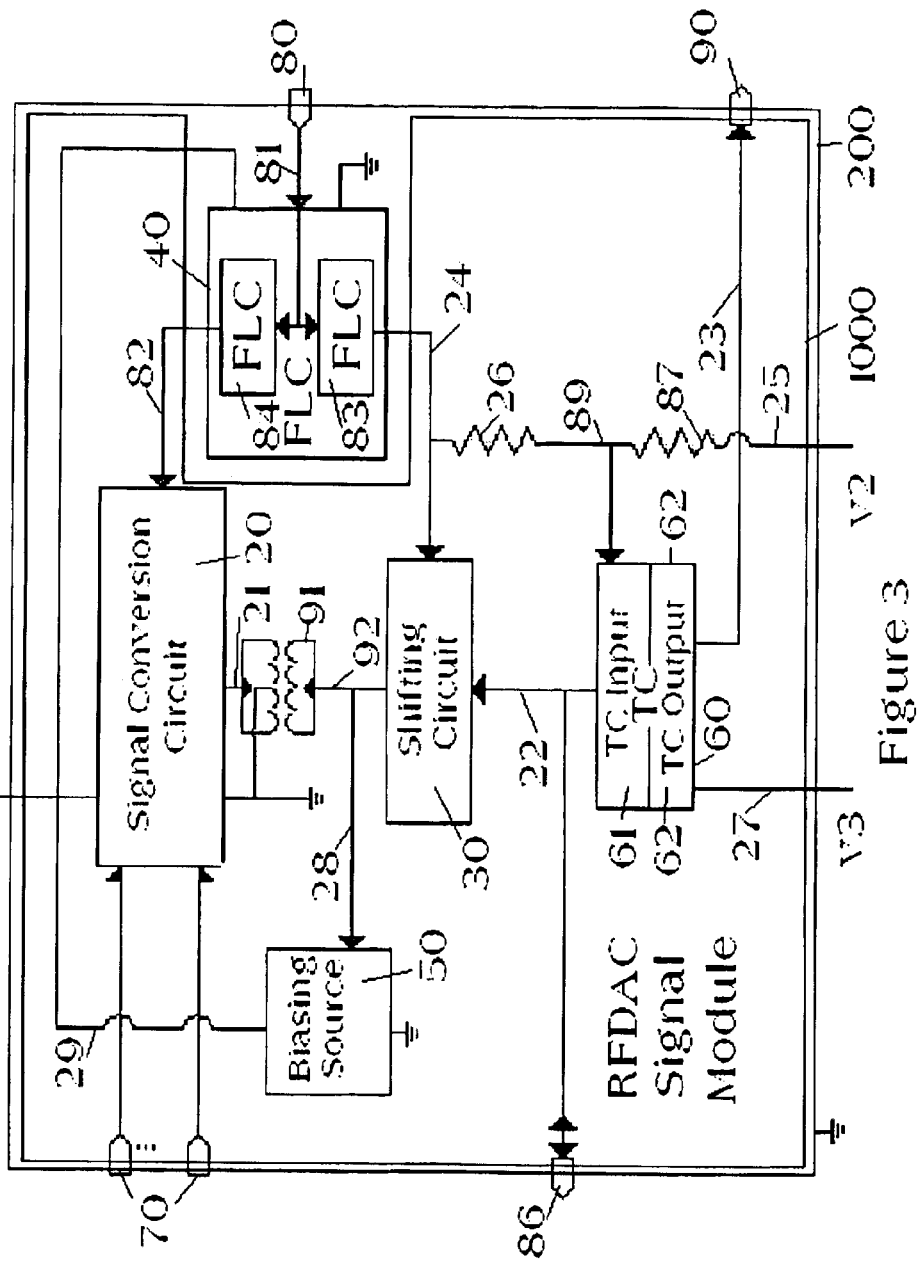
FIG. 3 illustrates another RFDAC embodiment, which is similar to RFDAC of FIG. 1, with like elements indicated by like reference numbers.

FIG. 3 illustrates another RFDAC embodiment 200, which is similar to RFDAC 10, with like elements indicated by like reference numbers. In the embodiment 200, however, the signal currents 22 and 28 are reversed in polarity with respect to the currents in RFDAC 10, and circuits 26, 30, 50, 60, and 83 are accordingly reversed in polarity with respect to the RFDAC 10 embodiment. A passive current polarity reversing circuit 91 is included in this embodiment to receive current signal 21 and reverse the current polarity creating signal current 92, which has a polarity consistent with the circuit polarities of elements 30, 50, and 60. Passive current polarity reversing circuit 91 may be a circuit with current gain or may be set to unity gain. Circuit 83 of circuit 40 has a polarity consistent with the polarity of circuit 30, 26, and 60. Likewise, circuit 84 of circuit 40 has a polarity consistent with the operation of circuit 20. Supply voltage 25 may be either set to the highest voltage in the system or may be set equal to supply voltage 29, it may not be grounded. Supply voltage 27 may be any level consistent with termination circuit output 62 operation.

Figure 4:
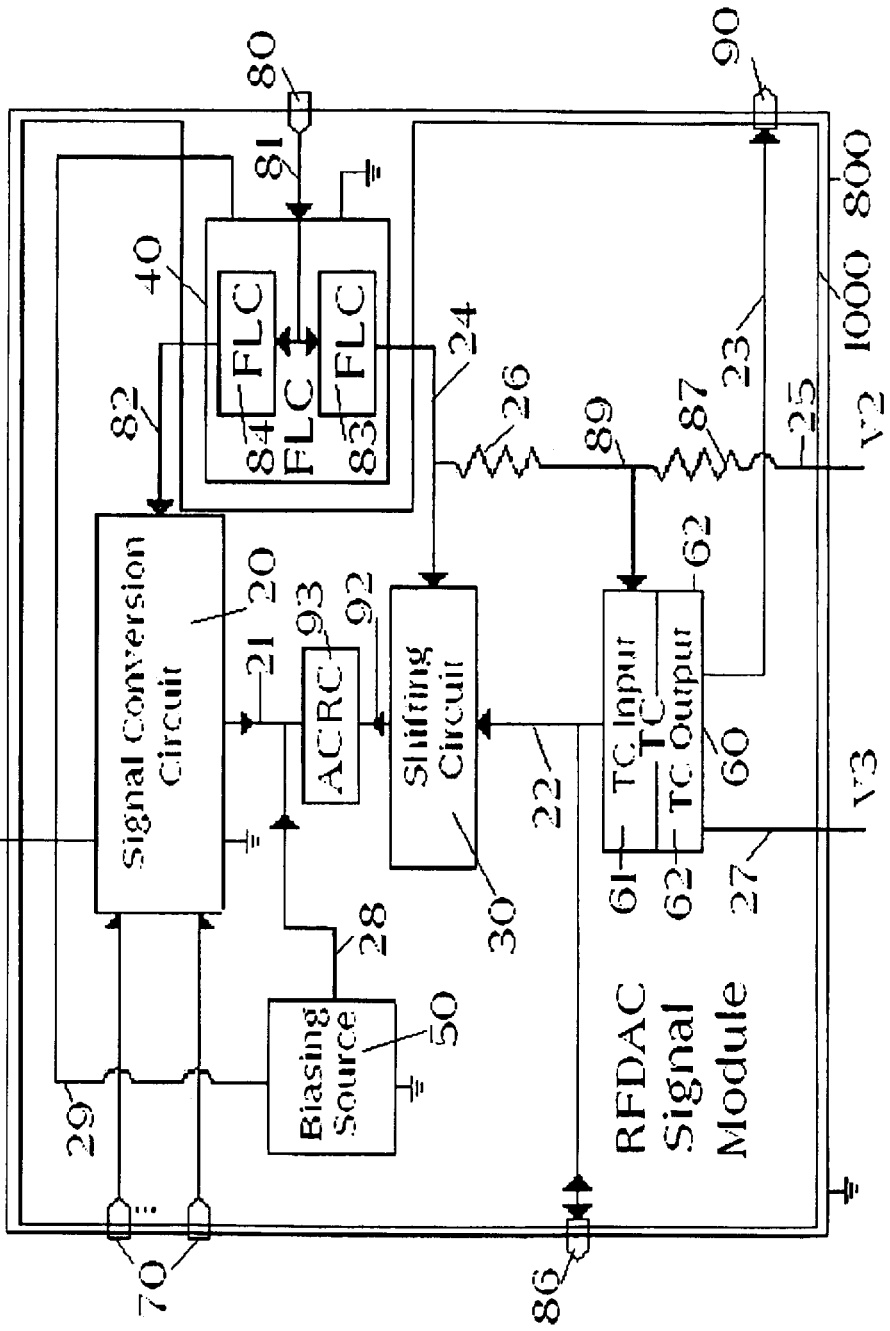
FIG. 4 illustrates another RFDAC embodiment, which is similar to the RFDAC of previous figures, with like elements indicated by like reference numbers.

FIG. 4 illustrates another RFDAC embodiment 800, which is similar to RFDAC 10 and 200, with like elements indicated by like reference numbers. In the embodiment 800, however, passive current polarity reversing circuit 91 is replaced with active current polarity reversing circuit 93. Active current polarity reversing circuit 93 may be a circuit with current gain or may be set to unity gain. Current 28 enters active current polarity reversing circuit 93, which serves to bias circuit 93, modulator circuit 30, and termination circuit 60. Current 28 has the same polarity of current 21. Circuit 50 is reversed in polarity with respect to RFDAC embodiments 100 and 200. All other circuits may retain the same function and polarity as RFDAC embodiment 200.

Figure 5:
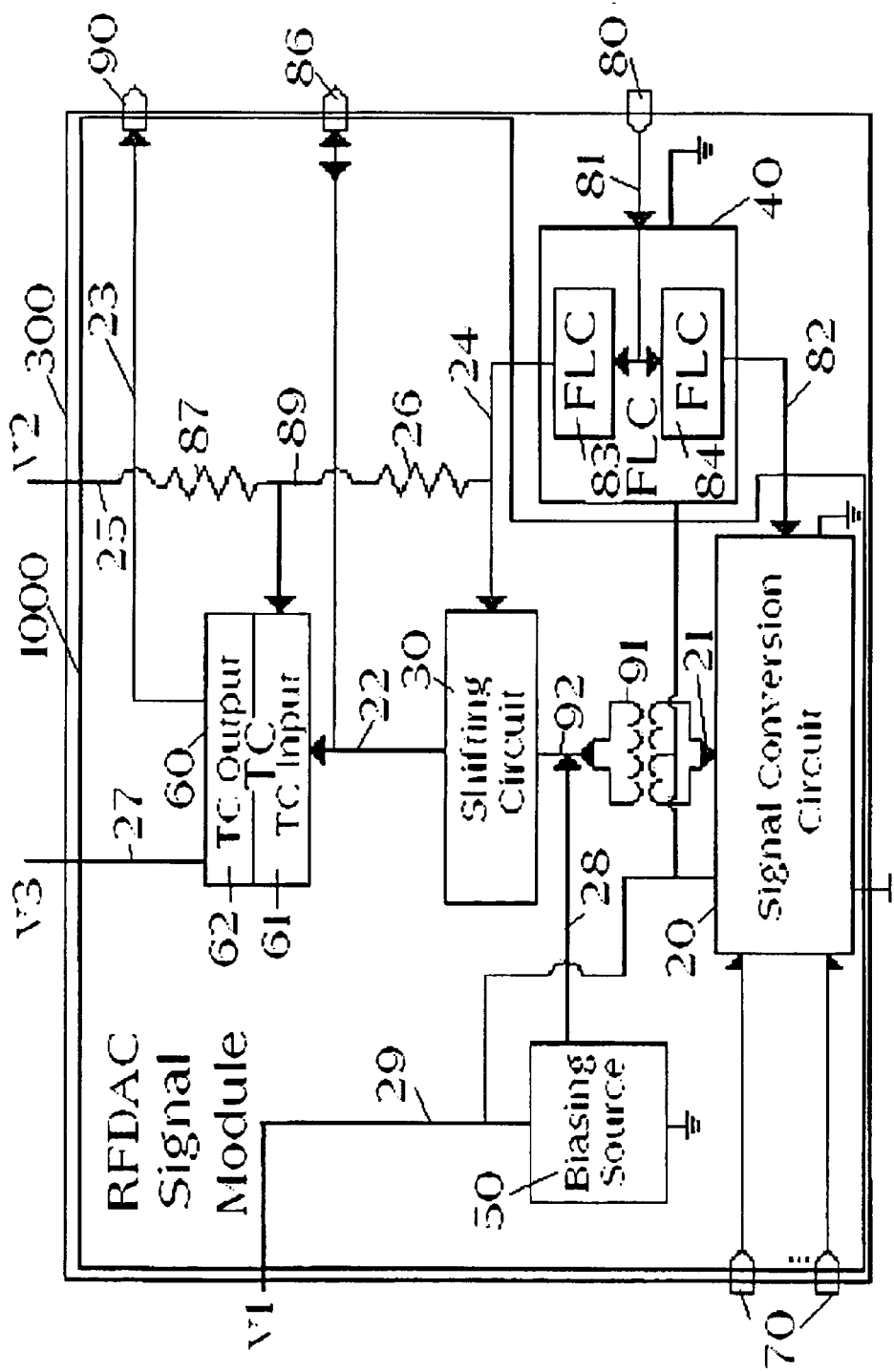
FIG. 5 illustrates another RFDAC embodiment, which is similar to RFDAC of FIG. 1, with like elements indicated by like reference numbers.

FIG. 5 illustrates another RFDAC embodiment 300, which is similar to RFDAC 10, with like elements indicated by like reference numbers. In the embodiment 300, however, the signal current 21 is reversed in polarity with respect to the currents in RFDAC 10. Signal conversion circuit 20 is accordingly reversed in polarity with respect to the RFDAC 10 embodiment. A passive current polarity reversing circuit 91 is included in this embodiment to receive current signal 21 and reverse the current polarity, creating signal current 92, which has a polarity consistent with the circuit polarities of elements 26, 30, 50 and 60. Passive current polarity reversing circuit 91 may be a circuit with current gain or may be set to unity gain. Circuit 83 of circuit 40 has a polarity consistent with the polarity of circuit 26, 30, and 60, and likewise, circuit 84 of circuit 40 has a polarity consistent with the operation of circuit 20. Supply voltage 25 may be set equal to any value of supply voltage consistent with the operation of circuits 26, 30, 50, and 60, or it may be grounded. Supply voltage 29 is set to a value consistent with circuit 20, 40, and 50 operation. Supply voltage 27 may be any level consistent with termination circuit output 62 operation.

Figure 6:
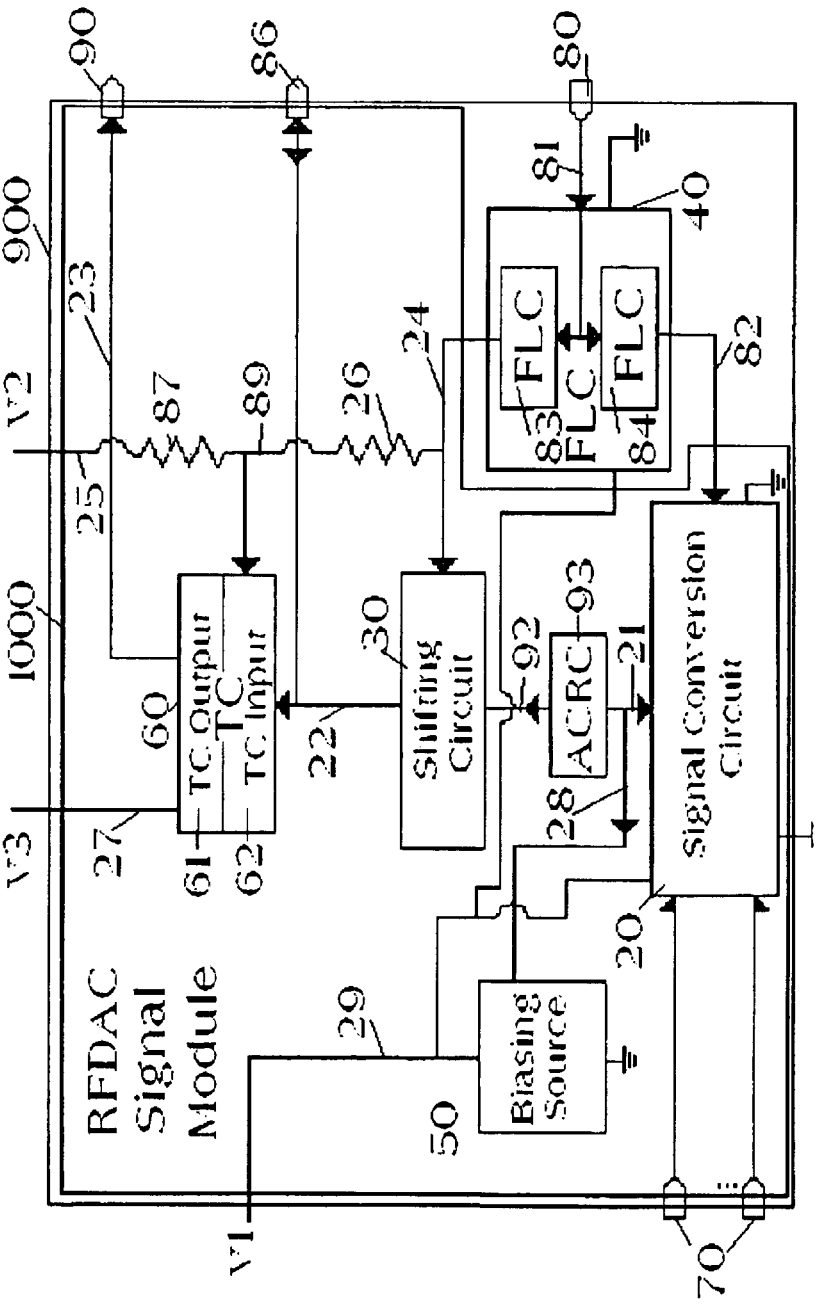
FIG. 6 illustrates another RFDAC embodiment, which is similar to the RFDAC of previous figures, with like elements indicated by like reference numbers.

FIG. 6 illustrates another RFDAC embodiment 900, which is similar to RFDAC 10 and 300, with like elements indicated by like reference numbers. In the embodiment 900, however, the passive current polarity reversing circuit 91 is replaced with active current polarity reversing circuit 93 and current 28 enters and serves to bias circuit 93, modulator circuit 30, and termination circuit 60, Active current polarity reversing circuit 93 may be a circuit with current gain or may be set to unity gain.

Current 28 has the same polarity of current 21. Circuit 50 is reversed in polarity with respect to RFDAC embodiments 300. All other circuits retain the same function and polarity ad RFDAC embodiment 300.

Figure 7:
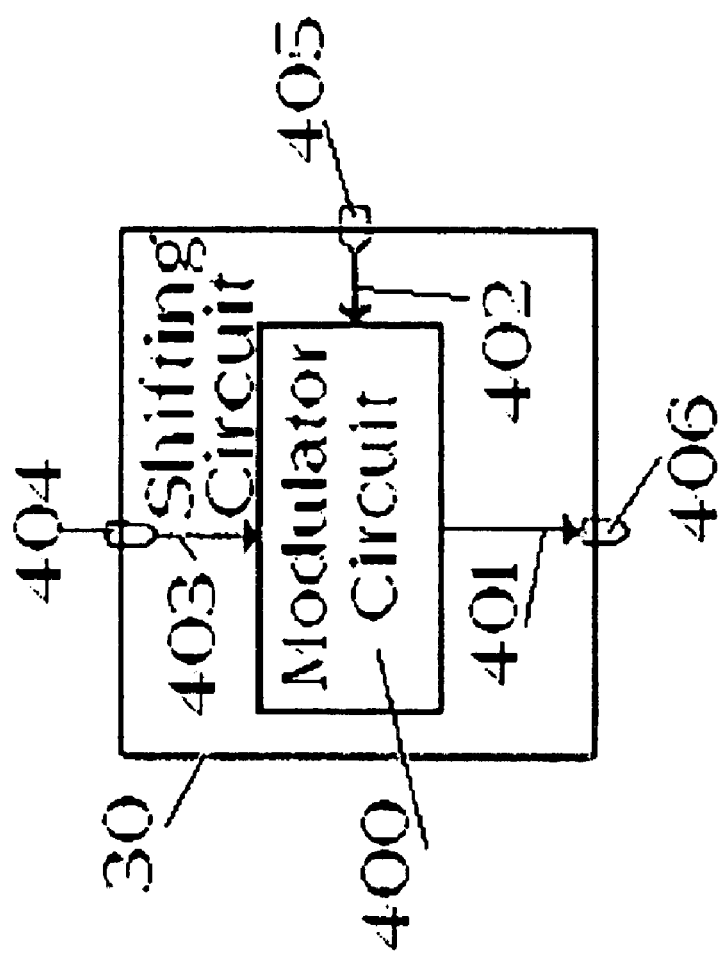
FIG. 7 illustrates the preferred embodiment of frequency/phase shifting circuit of the various RFDAC embodiments.

FIG. 7 illustrates the preferred embodiment of frequency/phase shifting circuit 30 of RFDAC embodiments 10, 100, 200, 300, 800, and 900. Baseband current enters modulator circuit 400 through port 404 and connection 403. Current signals entering port 404 are modulated by local oscillating signals presented at port 405 and presented to modulator circuit 400 via connection 402. Modulated current signals exit modulator circuit 400 via connection 401 and leave frequency/phase shifting circuit 30 via output port 406.

Figure 8:
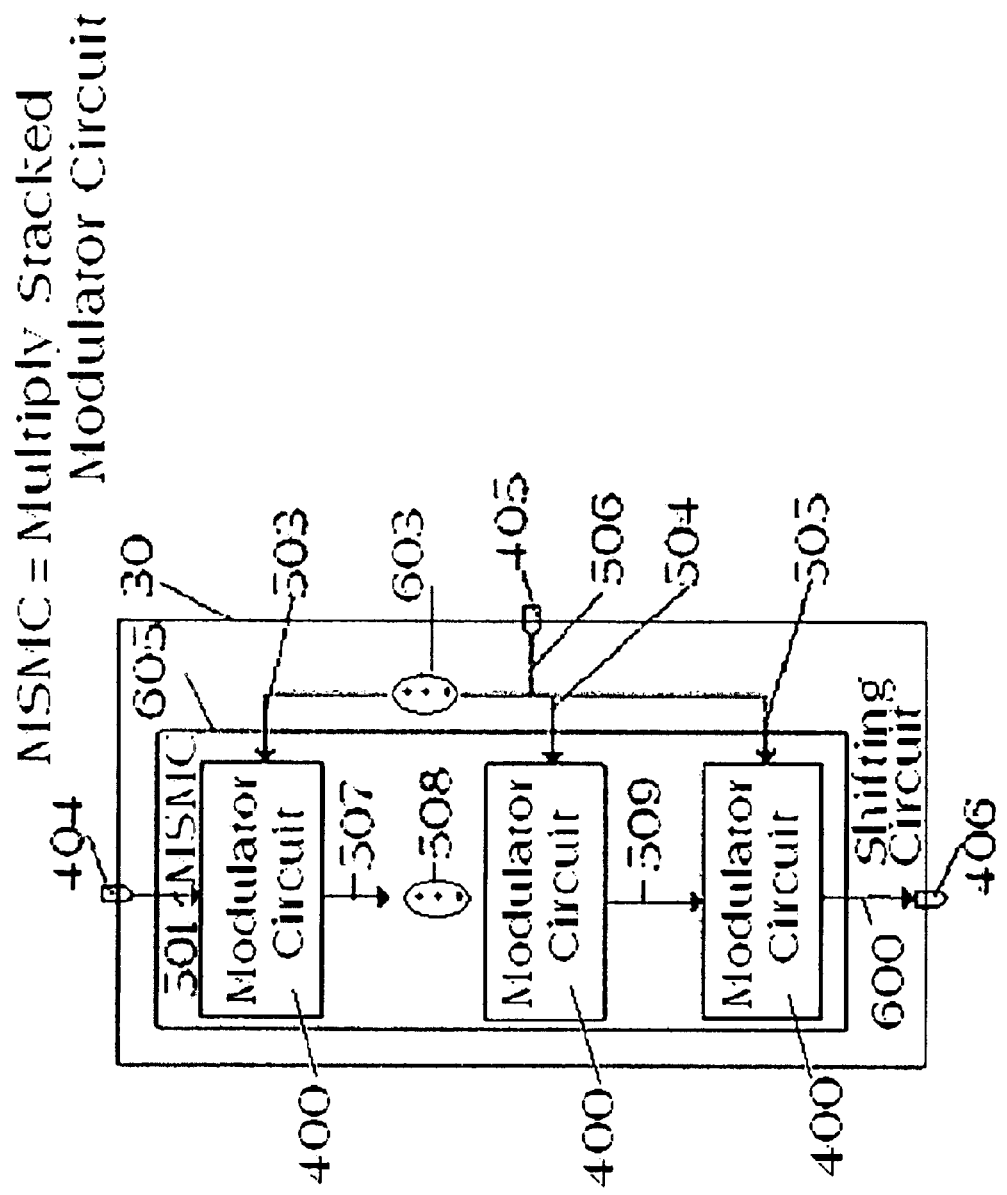
FIG. 8 illustrates an embodiment of frequency/phase shifting circuit of the various RFDAC embodiments, which incorporates multiply stacked modulator circuits.

FIG. 8 illustrates an embodiment of frequency/phase shifting circuit 30 of RFDAC embodiments 10, 100, 200, 300, 800, and 900, which incorporates multiply stacked modulator circuits 605. In this embodiment, any number of modulator circuits 400, may be stacked between supply rails, indicated by multiple dots 508 and 603. Biasing current is shared in the stack 605, reducing overall system power. Current enters the stack 605, via input port 404 and is presented to the stack 605, via connection 501. Local oscillator input port 405 inputs multiple local oscillating signals, one for each modulator circuit 400 in the stack 605. The individual local oscillating signals are separated from the local oscillator input port 405 and routed to the individual modulator circuits 400, via connection wires 503, 504, 505, and multiple dots 603 in this embodiment. Connection wires 507, 509 and multiple dots 508 route current signals between the modulator circuits 400, in the stack 605, and connection wire 600 routes the final current signal to output port 406.

Figure 9:
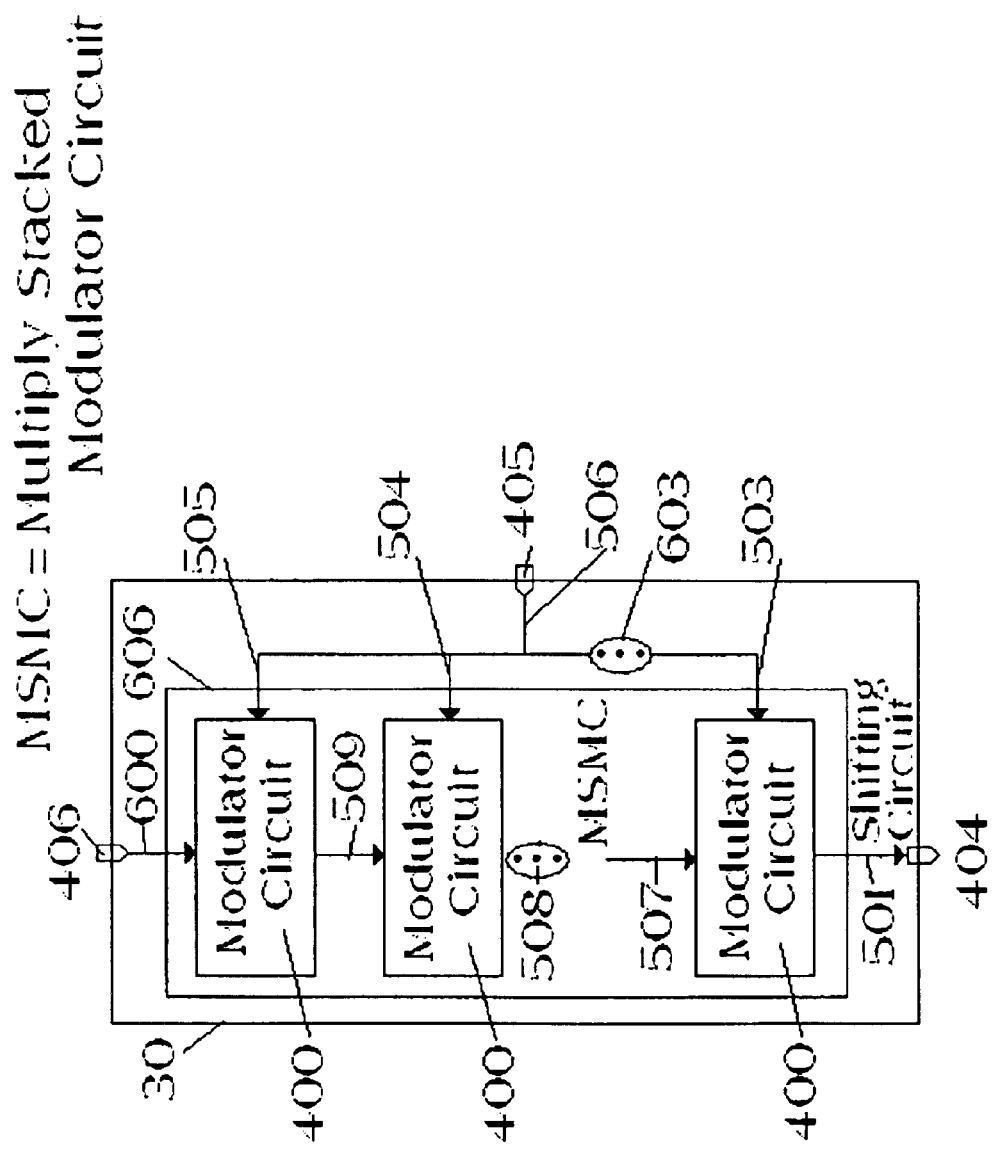
FIG. 9 illustrates another multiply stacked modulator circuit, which is similar to stack, with like elements indicated by like reference numbers.

FIG. 9 illustrates another multiply stacked modulator circuit 606, which is similar to stack 605, with like elements indicated by like reference numbers. The currents in connection wires 507, 509, multiple dots 508, and individual modulator circuits 400, are of reversed polarity, with reference to multiply stacked modulator circuit 605.

Figure 10:
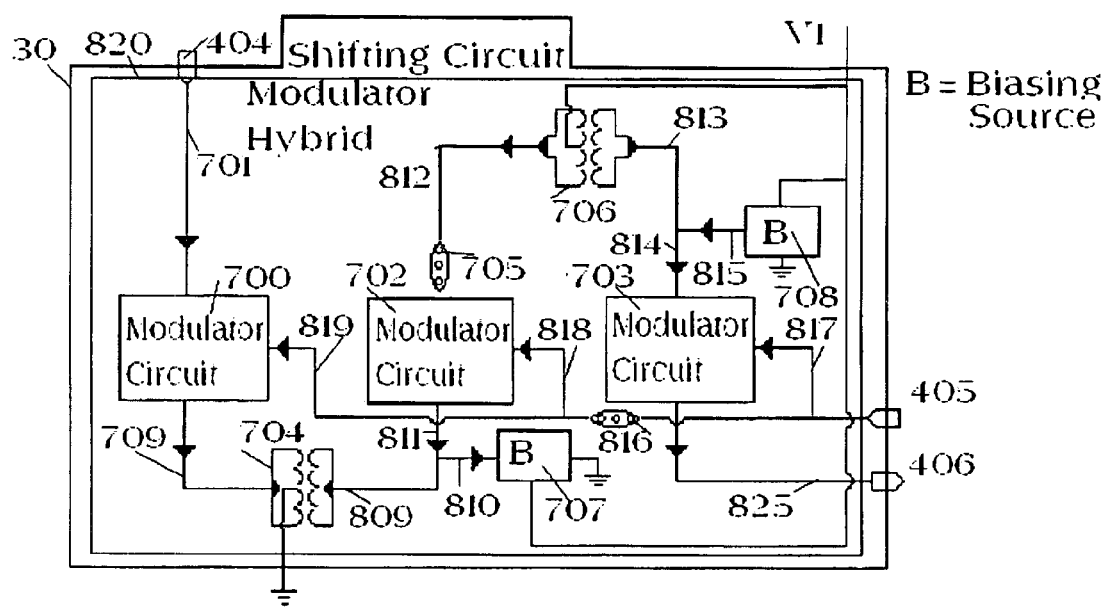
FIG. 10 illustrates an embodiment of frequency/phase shifting circuit of the various RFDAC embodiments.

FIG. 10 illustrates an embodiment of frequency/phase shifting circuit 30 of RFDAC embodiments 10, 100, 200, 300, 800, and 900. Modulator hybrid 820 is provided, in which modulator circuits 400 may be stacked or coupled utilizing current polarity reversing circuits. The current polarity reversing circuits may be circuits with current gain or may be set to unity gain. Current signals are applied to this embodiment via input port 404, and coupled to modulator circuit 700, which can be modulator circuit 400 or stack 605. Modulated current 709 exits modulator circuit 700 and is applied to current polarity reversing circuit 704. Current signal 810, generated by biasing circuit 707, is added to current signal 809 from polarity reversing circuit 704, to create current signal 811, and is applied to modulator circuit 702, which can be modulator circuit 400 or stack 605. Current exits via multiple dots 705, which indicate that the previously described process of modulate/current reverse/modulate can continue in an infinite fashion. Current 812 is applied to the final current reversing circuit 706, producing current signal 813, which when added to current 815, generated by biasing circuit 708, creates current 814, which is applied to modulator circuit 703, which can be modulator circuit 400 or stack 605. Final modulated current 825 exits modulator circuit 703 and is applied to output port 406. Local oscillator input port 405 inputs multiple local oscillating signals, one for each modulator circuit, 700, 702 and 703. The individual local oscillating signals are separated from the local oscillator input port 405 and routed to the individual modulator circuits, 700, 702 and 703 via connection wires 819, 818, 817, and multiple dots 816 in this embodiment.

Figure 11:
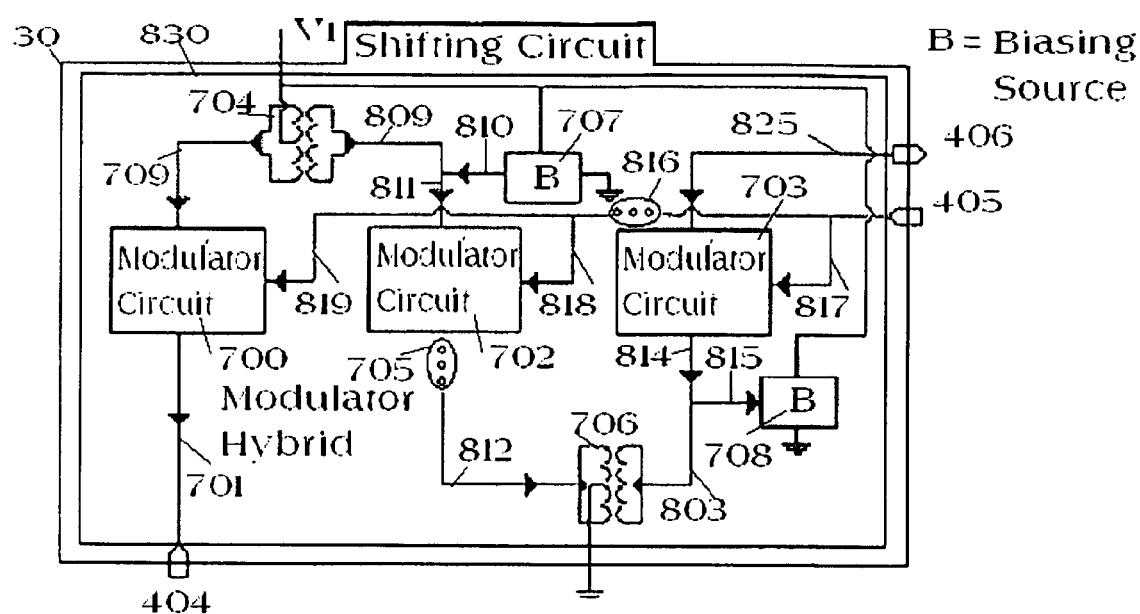
FIG. 11 illustrates another embodiment of frequency/phase shifting circuit of the various RFDAC embodiments.

FIG. 11 illustrates another embodiment of frequency/phase shifting circuit 30 of RFDAC embodiments 10, 100, 200, 300, 800, and 900. Modulator hybrid 830, which is similar to modulator hybrid 820, and is illustrated with like elements indicated by like reference numbers. The currents 701, 709, 803, 809, 810, 811, 812, 814, 815, 825, and multiple dots 705 and 816 are of reversed polarity, with reference to modulator hybrid 820. Circuits 700, 702, 703, 704, 706, 707, and 708 (which can be modulator circuit 400 or stack 606) are also of reversed polarity with respect to modulator hybrid 820.

Figure 12:
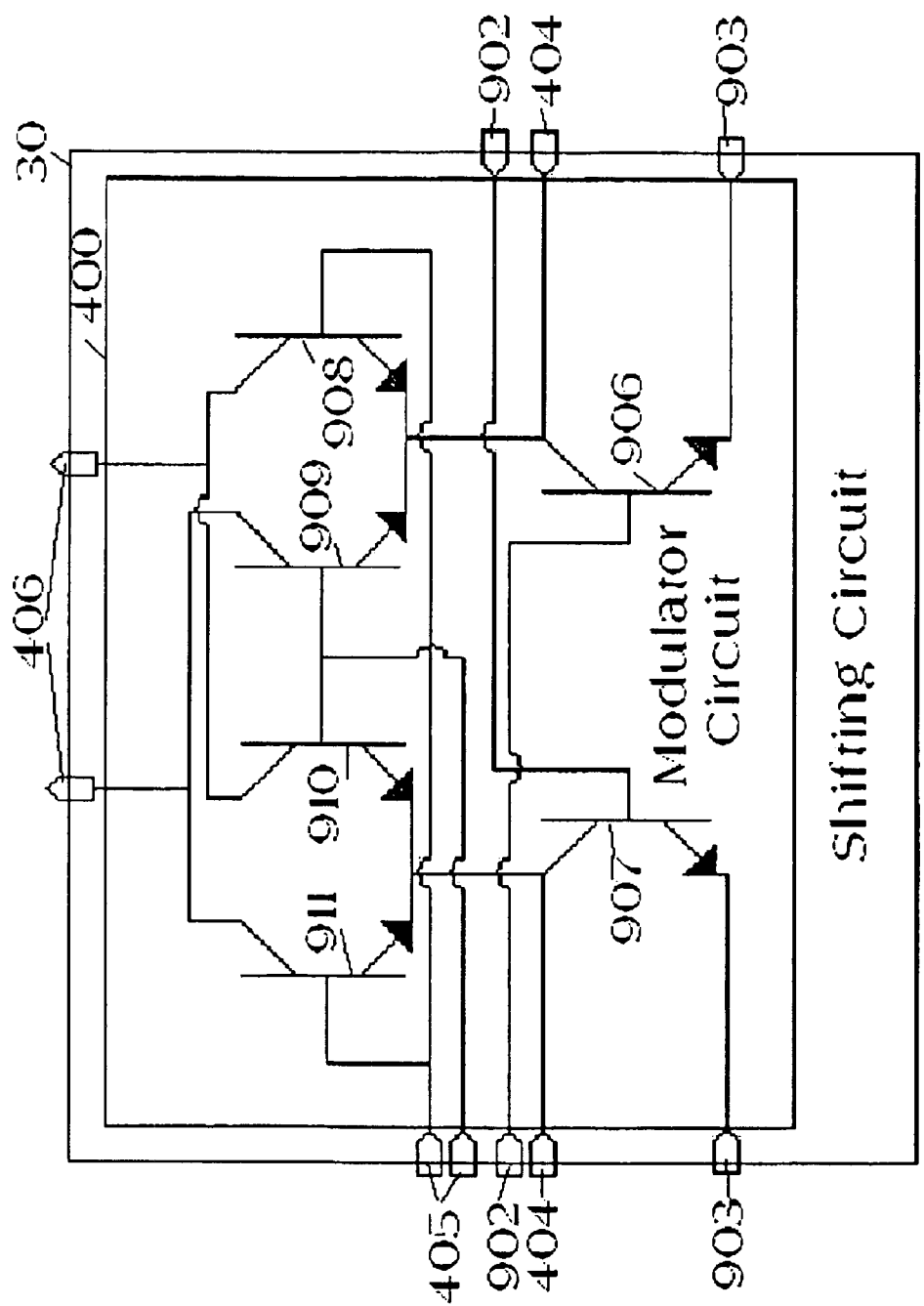
FIG. 12 illustrates the preferred embodiment of modulator circuit of the various RFDAC embodiments.

FIG. 12 illustrates the preferred embodiment of modulator circuit 400 of RFDAC embodiments 10, 100, 200, 300, 800, and 900. The modulator circuit 400 includes differential input port 903, differential input port 404, differential control port 902, differential local oscillator port 405, differential output port 406, cascode transistors 906 and 907, and current reversing transistors 908, 909, 910, and 911.

Differential port 903 directly connects and transfers currents to the emitter terminals of transistors 906 and 907. Differential input port 404 also transfers currents into modulator circuit 400 by applying said currents directly to the emitter terminals of transistors 908, 909, 910, and 911. Differential input port 902 transfers voltage signals into modulator circuit 400 by applying said voltage signals directly to the bases of cascade transistors 906 and 907. Differential local oscillator port 405 transfers voltage signals into modulator circuit 400 by applying said voltage signals directly to the base inputs of transistors 908, 909, 910, and 911. Differential output port 406 receives and outputs modulated current signals from the collectors of transistors 908, 909, 910, and 911.

The circuit 400 is a triple mode circuit, presenting a low voltage standing wave ratio (VSWR) differential input port 903, if differential input port 404 is directly tied and cross coupled to differential input port 902 (i.e. the base input of cascode transistor 906 tied to the collector of cascode transistor 907, and, conversely, the base input of cascade transistor 907 tied to the collector of cascode transistor 906). A low headroom modulator circuit 400 may be realized if current signals are presented to the differential input port 404. A modulator circuit with internal gain may be formed if dc current sources drive differential input port 903 and differential voltage signals drive differential control port 902.

The modulator circuit illustrated in this embodiment may be used in upconversion, if baseband or DC signals presented at differential input port 903, differential input port 404, or differential control port 902, or in downconversion, if RF signals are presented at differential input port 903, differential input port 404, or differential control port 902. For example, if port 902 is cross connected to port 404, port 903 of modulator circuit 400 forms a low VSWR differential input port suitable for accepting current signals directly from current mode filters. Series impedance matching resistors may be connected to the filter output, with their opposite ends terminated directly to port 903. This allows currents to flow directly from the filter into the modulator circuit 400. A second current signal may also be input into modulator circuit 400 via port 404. With a local oscillating signal applied to port 405, port 406 produces a modulated current signal based on the frequencies presented at ports 903,404, and 405.

This embodiment of modulator circuit 400 of RFDAC embodiments 10, 100, 200, 300, 800, and 900 may be represented equivalently by switching transistor polarities (i.e. replacing NPN bipolar junction transistors with PNP bipolar junction transistors or replacing the bipolar junction transistors with N or PMOS transistors). It may also be represented by a mixture of said circuits.

Local Oscillator Clock and Spectral Characteristics

Generally, there is no restriction on the frequency of the master input clock 81, presented at port 80, in RFDAC embodiments 10, 100, 200, 300, 800, and 900. However, for optimal performance when a digital to analog conversion circuit or analog to digital conversion circuit (sampled system) is used as the signal conversion circuit 20 (forming RFDAC embodiments 10, 100, 200, 300, 800, and 900), the local oscillator signal(s) 24 and 89 may be locked to the fundamental or a harmonic multiple of the data clock 82 used in the system, or conversely, the sampling or data clock 82 may be locked to an integer divisor of the local oscillating signal 24 and 89. This alignment serves to minimize the number of filters necessary for the design and facilitates a cleaner final output spectrum.

Master clock signal 81 is presented to frequency locking circuit 83, which serves to integer multiply or divide the master clock signal 81, dependent on the frequency of the master clock signal 81. Circuit 83 serves to generate local oscillator signal(s) 24 and 89. Local oscillator signal(s) 24 and 89 may be any number of signals needed for driving frequency/phase shifting circuit(s) 30 and termination circuit(s) 60. Also, voltage translation circuit 26 and common mode circuit 87 may be any number of circuits, one for each local oscillating signal 24 and 89. Master clock signal 81 is also presented to frequency locking circuit 84, which serves to derive an integer locked clock signal or Fs for the signal conversion circuit 20 Signal Fs 82, usually is but is not limited to a single signal and is less than (integer divisor) or equal to the Master clock signal 81, and the generated local oscillator signal(s) 24 and 89.

Figure 13:
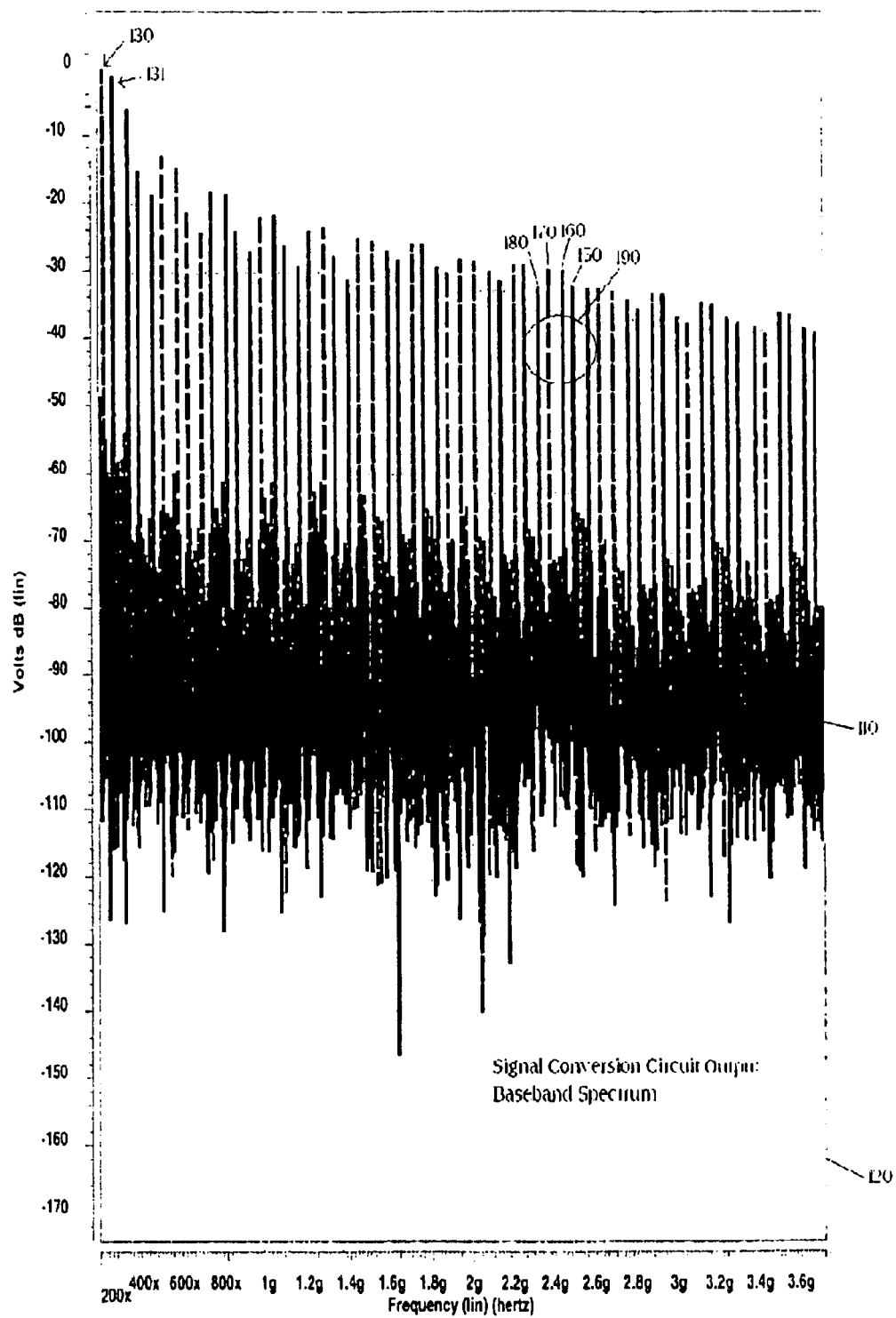
FIG. 13–15 illustrate various characteristics of operation.
Figure 14:
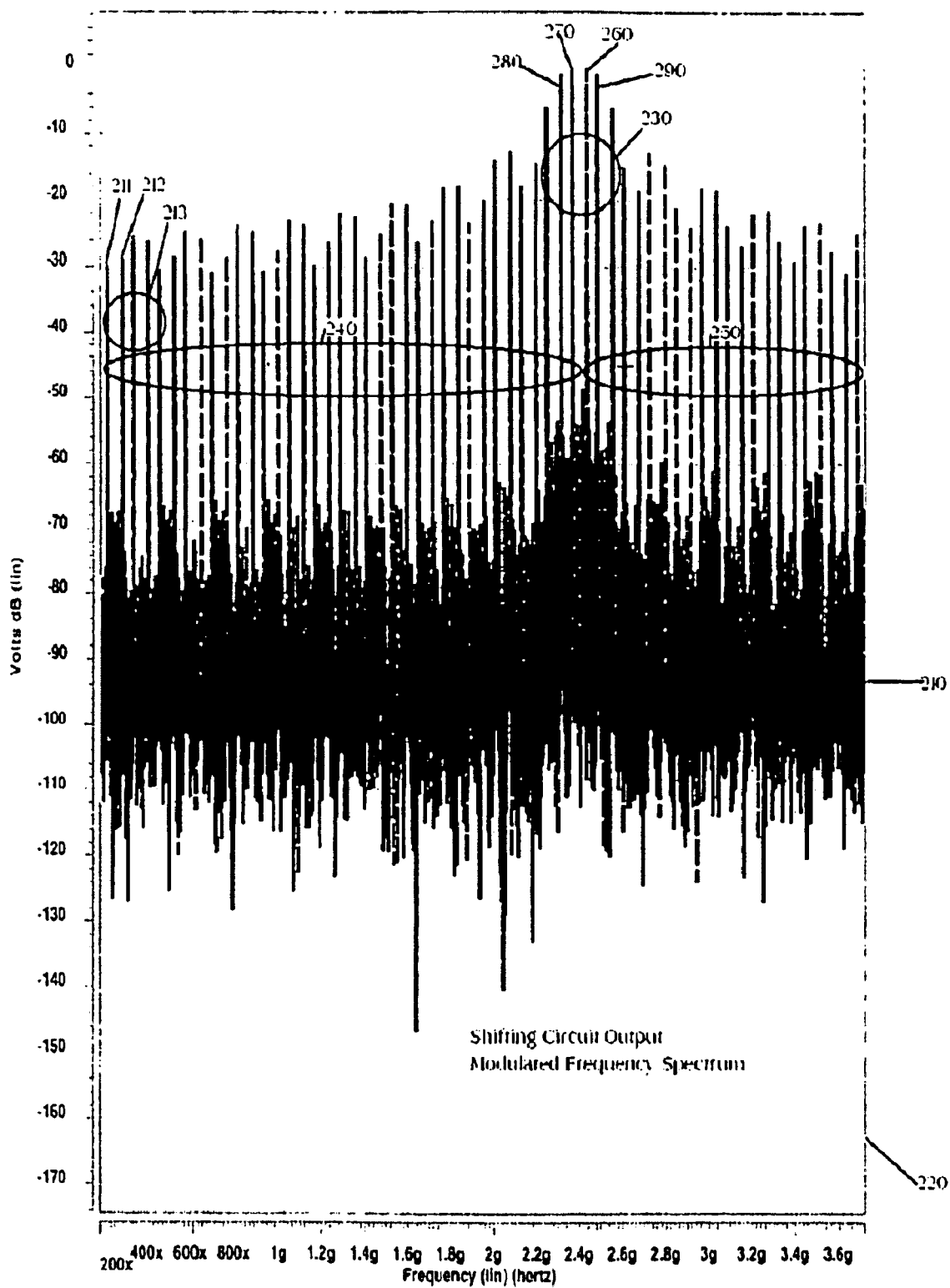

Since the mixing action of the frequency/phase shifting circuit 30 produces the sum and the difference of the local oscillating signal(s) 24 and the current signal 21 as well as passing the local oscillating signal(s) 24 and the current signal 21 or spectrums, harmonically locking the local oscillating signal(s) 24 to the Fs signal 82 or subharmonically locking the Fs signal 82 to the local oscillating signal(s) 24 allows the baseband spectrum 110 (FIG. 13, Graph 120), generated at current signal 21, to be aligned spectrally with the upconverted sum and difference spectrums 210 (FIG. 14, Graph 220), generated at current signal 22, resulting in a cleaner sum and difference modulated frequency spectrum 210 (FIG. 14, Graph 220).

Since the time domain mixing or multiplication results in frequency domain convolution of the local oscillating signals(s) 24 and the baseband input spectrums (FIG. 13, Graph 120), generated at current signal 21, the mixing action of the frequency/phase shifting circuit 30 produces frequency domain convolution peaks 230, (FIG. 14, Graph 220), in current signal 22 centered around the fundamental and harmonic frequencies of the local oscillating signal(s) 24.

In this way, the baseband spectrum 110, (FIG. 13, Graph 120), in particular, the circuit 20 fundamental 130, (FIG. 13, Graph 120), and first alias 131, (FIG. 13, Graph 120), is upconverted and split into sum spectrum 250, (FIG. 14, Graph 220), and difference spectrum 240, (FIG. 14, Graph 220) located symmetrically about the local oscillating signal (s) 24. Specifically, the circuit 20 fundamental 130, (FIG. 13, Graph 120) is frequency shifted and split into signals 260 and 270 of FIG. 14, Graph 220. The circuit 20 first alias 131, (FIG. 13, Graph 120) is frequency shifted and split into signals 290 and 280 of FIG. 14, Graph 220. These sum 250, (FIG. 14, Graph 220), and difference 240, (FIG. 14, Graph 220) spectrums contain the original baseband, Nyquist bandwidth and Nyquist characteristics of circuit 20. Conversely, the alias signal components 150, 160, 170 and 180 of FIG. 13, Graph 120 of the signal conversion circuit 20 that did reside in the region of spectrum a Nyquist bandwidth plus or minus the local oscillating signal(s) 24, are now up or down converted to signals 212 and 211 (FIG. 14, Graph 220). Thus, this "frequency shifting" of the DAC output spectrum serves to effectively shift fundamental DAC frequency signals 130 and 131 of FIG. 13, Graph 120 to areas of spectrum normally occupied by DAC aliases, 230 of FIG. 14, Graph 220, and conversely, shift DAC aliases out of their normal spectral positions, (signals 150, 160, 170, and 180 of FIG. 13, Graph 120) to other, now unwanted, regions of the DAC output spectrum (213 of FIG. 14, Graph 220).

This "frequency shifting" is a very powerful characteristic of the RFDAC spectrum, in that, normally, if one wished to utilize higher frequency, aliased components of the baseband DAC output spectrum (signals 150, 160, 170, and 180 of FIG. 13, Graph 120), one would need to band pass filter these components, then amplify signals 150, 160, 170, and 180 of FIG. 13, Graph 120 as well as the noise residing in the alias portions of the DAC spectral output 190 of FIG. 13, Graph 120. With this "frequency shifting" technique, one may effectively obtain higher amplitude, cleaner signals without the need for such amplification. This "frequency shifting" technique allows the baseband DAC, circuit 20 spectrum 110, (FIG. 13, Graph 120), to be directly upconverted and form the RF spectrum (210 of FIG. 14, Graph 220) with very little additional distortion This technique also allows for the elimination of a DAC anti-alias filter (eliminating modulator system group delay) and aids in loosening the specs of the RFDAC termination circuit 60, in that the frequencies that are to be passed are "virtually amplified" by the upconverter mixing action, and frequencies that are not to be passed are "virtually attenuated" by the upconverter mixing action, all prior to being presented to the termination circuit 60 for frequency selection.

Since it is desirable for the final output of the RFDAC to be limited in bandwidth in order for its output to fit within its assigned frequency allocation, a termination on circuit 60 is used to limit the frequencies passed to the final components in the transmitter system. For optimal performance, the termination circuit pass band may obey the bounds set forth by at least one of the following relationships. These are set forth in Table 1.

TABLE 1

1) $N * LO + Z * (Fs/2)$
2) $N * LO - Z * (Fs/2)$
3) $[N * LO + Z * (Fs/2)] + [Z * (Fs/2) + Z * Fs]$
4) $[N * LO - Z * (Fs/2)] - [Z * (Fs/2) - Z * Fs]$ where the LO is the local oscillator 24 signal, and Fs is the final sampling clock frequency 82.

The above relations are valid if Fs=LO/M and LO=Fs*M, the function of circuit 40 of RFDAC 10, 100, 200, 300, 800, and 900. Lastly, N, M, and Z are non-zero, independent integers.

Figure 15:
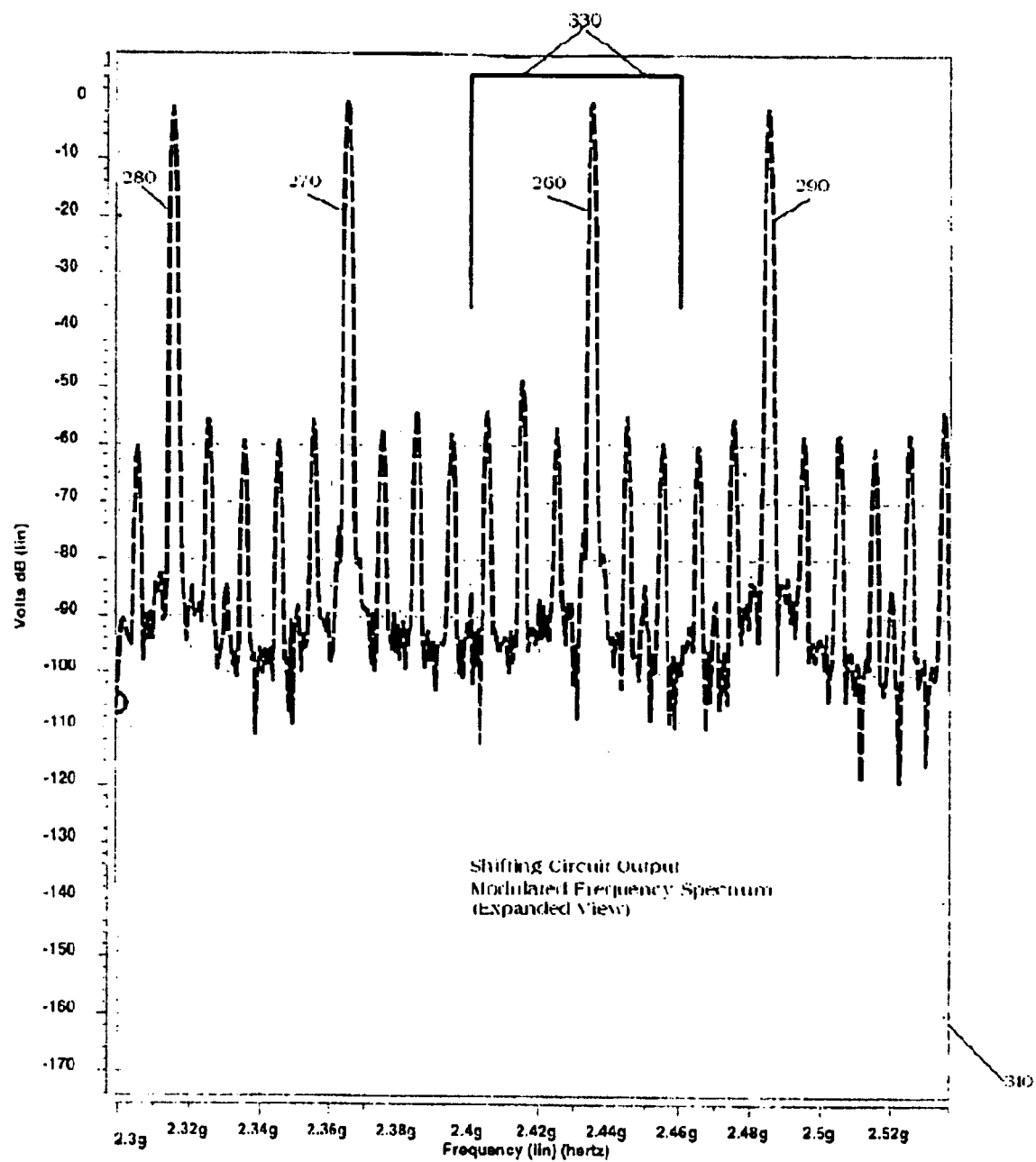

A practical application of this bounding is shown in Graph 310. FIG. 15, Graph 310 is an expanded view of FIG. 14, Graph 220 with like frequency components indicated by like reference numbers. In FIG. 7, the first relationship is utilized to set the termination circuit bandwidth 330, N*LO+Z*(Fs/2), with N=1, Z=1, M=20, and the LO=2400 MHz. In this case signal 260 is passed, and signals 270, 280, and 290 are rejected. All other frequency relationships discussed above are equally valid, though not illustrated.

Manufacturing Partitioning for RFDAC Frequency Plan Modification

One manufacturing limitation in RF systems is the inability to change frequency plans easily. With appropriate partitioning of the RF components necessary for the RFDAC architecture, one may switch frequency plans with little expense.

Figure 16:
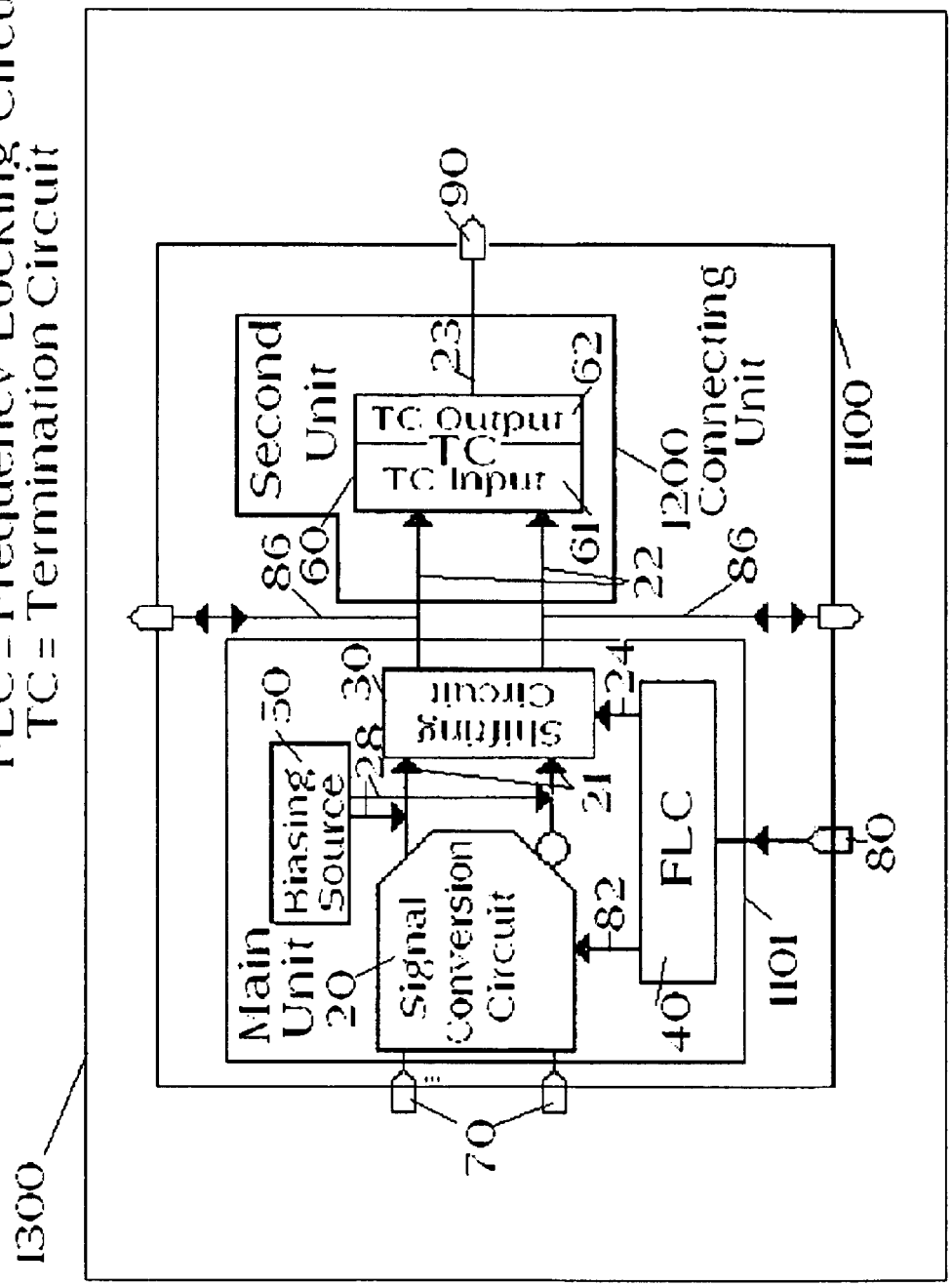
FIG. 16 illustrates a partitioning of the RF components necessary for the RFDAC architecture.

FIG. 16 illustrates this partitioning. All the components of embodiment 1300, which can be embodiments 10, 100, 200, 300, 800, and 900, with like elements indicated by like reference numbers, are placed in or on main unit 1101, with the exception of termination circuit 60. The termination circuit 60 is placed in or on a second unit 1200 which is mounted on or in connecting unit 1100. This allows for quick changes in the output frequencies passed from the RFDAC. Once second unit 1200 is replaced or adjusted, a simple adjustment of the integer relationship between the upconverter LO and the baseband DAC sampling clock completes the frequency plan modification for the RFDAC.

Quadrature Clock Generation

The generation of broadband, phase accurate, high quality, quadrature LOs for single sideband modulation/quadrature detection systems may be of prime importance if high quality systems are to be produced. The quality of these 90 degree phase offset signals is usually the limiting factor in system sideband suppression and I/Q detection.

While extremely phase accurate LOs may be generated utilizing direct digital synthesis (DDS) techniques, these systems are generally power prohibitive if overall system power is a premium. The quadrature LO generation techniques described herein may utilize a low power, low tuning resolution, high phase resolution DDS engine to generate phase accurate baseband signals and upconvert these current mode signals to RF via RFDACs illustrated in embodiments 10, 100, 200, 300, 800, and 900.

Figure 17:
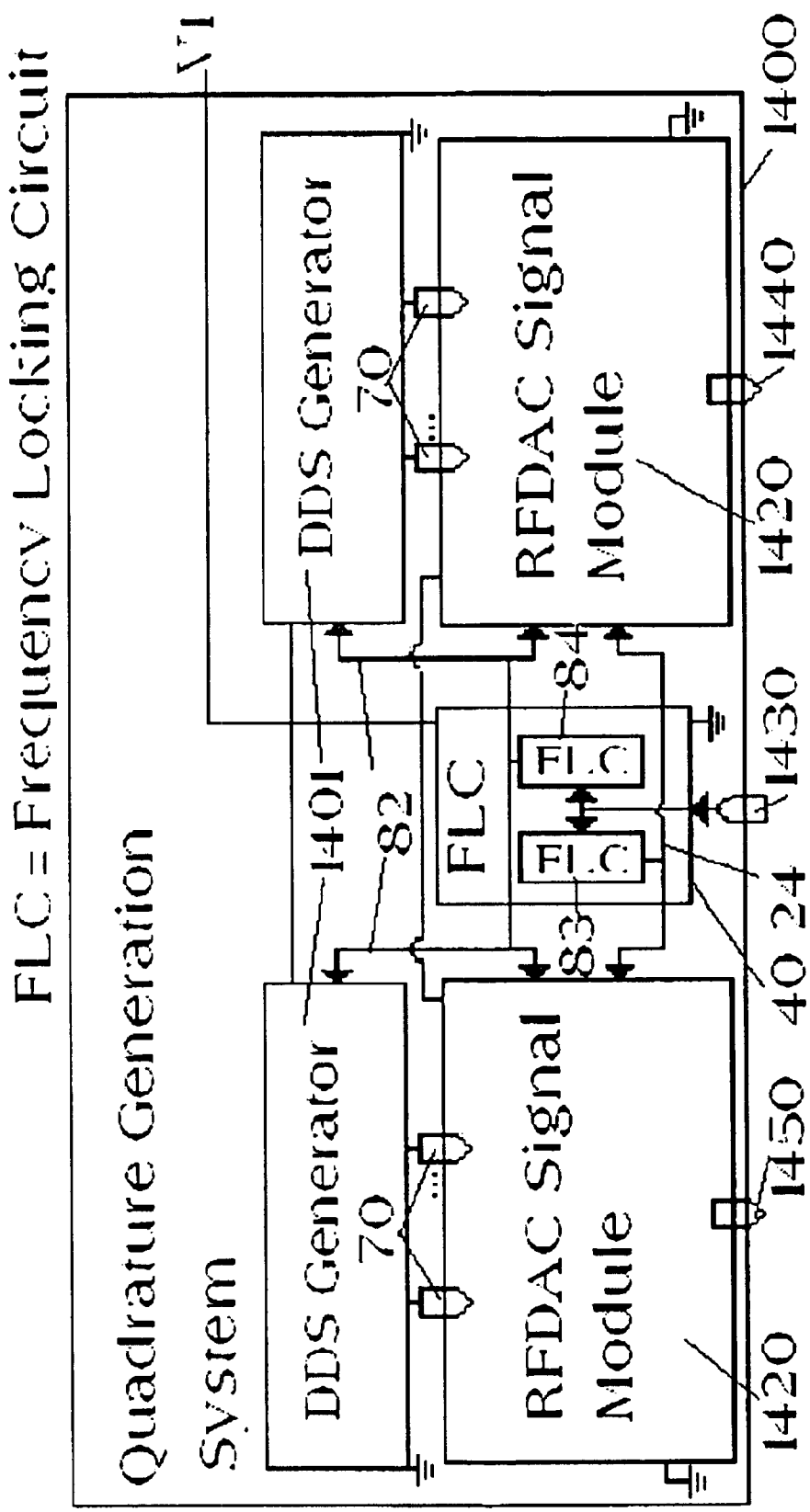
FIG. 17 shows a quadrature generation system.

The quadrature generation system 1400 embodied in FIG. 17 shows the essentials of the low power, phase accurate, and quadrature LO generator. Dual quadrature offset, phase adjustable, DDS generators 1401 are used as phase accurate waveform generators in embodiment 1400. The generators 1401 may be binary up/down counters, look up table DDS generators, or reduced look-up table DDS generators.

The output of the dual DDS generators 1401, are fed via port 70, to dual RFDAC signal modules 1420, which can be signal module 1000 of RFDACs 10, 100, 200, 300, 800, and 900. The baseband DACs 20 of signal module 1000 may have a resolution greater than or equal to 2 bits. The output signals of the RFDACs 1420 are presented at ports 1440 and 1450.

As with the local oscillating signal 24, shown in embodiments 10, 100, 200, 300, 800, and 900, the IF or LO signals 24, are spectrally locked to the DAC and DDS clocks 82 (and integer relationship) via the circuit 40 In this embodiment, however, circuit 40 has dual outputs, one for each RFDAC 1420, and DDS engine 1401. Circuit 40 is driven by a master clock signal presented at port 1430.

Single Sideband Modulation

Figure 18:
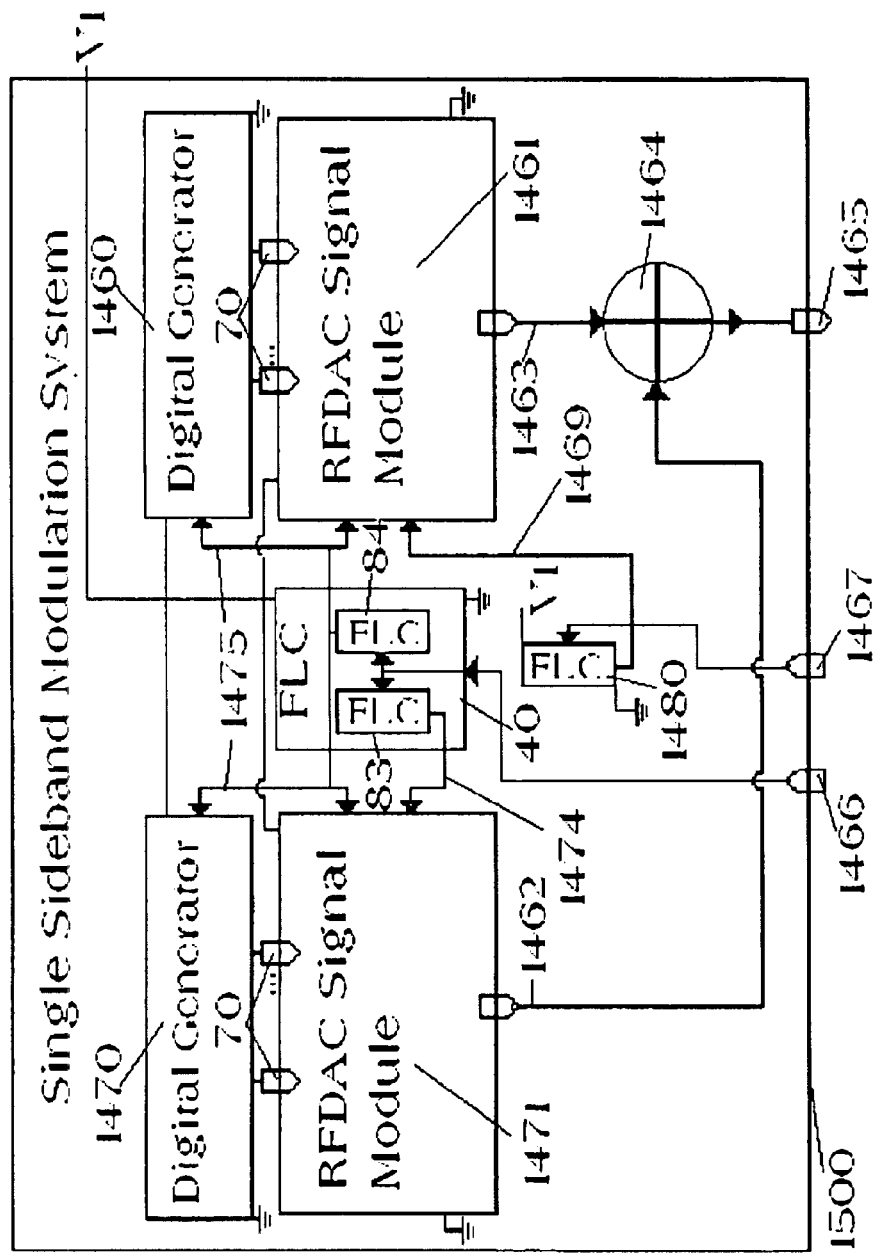
FIG. 18 shows a quadrature modulation system.

The single sideband modulation system 1500 embodied in FIG. 18 shows the essentials of a low power, low distortion, single sideband modulator. 0 and 90 degree phase offset baseband digital generators, 1470 and 1460, respectively, drive RFDACs 1471 and 1461, respectively, in embodiment 1500. The output of the 0 and 90 degree phase offset baseband digital generators 1470 and 1460, are fed via port 70, to RFDAC signal modules 1471 and 1461, which can be signal module 1000 of RFDACs 10, 100, 200, 300, 800, and 900.

Baseband DAC and digital generator clock 1475 is derived by circuit 84 of circuit 40 from the 0 degree phase offset master clock signal presented at input port 1466. Local oscillatiing signal 1474, generated by circuit 83 of circuit 40 is also derived from the 0 degree phase offset master clock signal presented at input port 1466.

As with local oscillating signal 24, shown in embodiments 10, 100, 200, 300, 800, and 900, the IF or LO signals 1474, are spectrally locked to the baseband DAC and digital generator clocks 1475 (and integer relationship) via the circuit 40. In this embodiment, however, circuit 40 has dual outputs, one for each RFDAC 1471 and 1461, and baseband digital generator engines 1470 and 1460. Circuit 1480, which is identical to circuit 83 of circuit 40, generates local oscillating signal 1469, which is applied to the local oscillating port of RFDAC 1461. Local oscillating signal 1469, which is the same frequency as local oscillating signal 1474 and is also spectrally locked to signal 1475, maintains the 90 degree phase offset of the master clock signal presented at input port 1467, and serves to convert the 90 degree phase offset data and resultant analog signals from the 90 degree phase offset baseband digital generator and baseband DAC to a 180 phase relationship. The 0 degree phase offset output signal of the RFDAC 1471 is presented via signal 1462 to signal summer 1464 and the 180 degree phase offset output signal of the RFDAC 1461 is presented via signal 1463 to signal summer 1464 for sideband phase cancellation The output of signal summer 1464 is the presented to output port 1465.

While various embodiments have been described above, it should be understood that they have been presented by way of example only, and not limitation. For example, any of the network elements may employ any of the desired functionality set forth hereinabove. Thus, the breadth and scope of a preferred embodiment should not be limited by any of the above-described exemplary embodiments, but should be defined only in accordance with the following claims and their equivalents. Just by way of example, one embodiment may be implemented in the context of a binary phase shift ure phase shift keyed (QPSK) modulator/demodulator.

What is claimed is:

1. A radio frequency (RF) converter system for generating RF signals, comprising:
  a signal conversion circuit for at least one of digital signal processing (DSP) and converting between digital signals and analog signals;
  a shifting circuit in communication with the signal conversion circuit for at least one of frequency shifting and phase shifting at least one of the digital signals and analog signals, as a function of at least one of an oscillating signal and a baseband signal to generate modulated signals; and
  a termination circuit in communication with the shifting circuit for transmitting a portion of the modulated signals;
  wherein a frequency associated with the at least one of the oscillating signal and the baseband signal, a frequency associated with the termination circuit, a frequency corresponding to a clock associated with the signal conversion circuit, and a frequency associated with a master clock are integer multiples of each other.

2. An RF converter system as recited in claim 1, wherein an output of the termination circuit is isolated from an input thereof.

3. An RF converter system as recited in claim 1, wherein a frequency locking circuit ensures that the frequency associated with the oscillating signal, the frequency associated with the termination circuit, the frequency corresponding to the clock associated with the signal conversion circuit, and the frequency associated with the master clock are integer multiples of each other.

4. An RF converter system as recited in claim 1, wherein an input of the termination circuit has a reference that is common with an input of the shifting circuit.

5. An RF converter system as recited in claim 1, wherein the shifting circuit is directly connected to the signal conversion circuit.

6. An RF converter system as recited in claim 1, wherein a polarity of a current from the signal conversion circuit is reversed to match a polarity of a current to the shifting circuit.

7. An RF converter system as recited in claim 1, wherein the oscillating signal associated with the shifting circuit and an input of the termination circuit have a reference that is common.

8. An RF converter system as recited in claim 7, wherein the reference is adjustable.

9. An RF converter system as recited in claim 1, wherein a DC biasing current flowing into the shifting circuit is adjustable, zero inclusive.

10. An RF converter system as recited in claim 1, wherein a DC biasing current flowing into the shifting circuit is set equal to a full scale current value of the signal conversion circuit.

11. An RF converter system as recited in claim 1, wherein the integer multiple is a less than one (1) such that the frequency associated with the oscillating signal, the frequency associated with the termination circuit, the frequency corresponding to the clock associated with the signal conversion circuit, and the frequency associated with the master clock are integer divisor of each other.

12. An RF converter system as recited in claim 1, wherein the integer multiple includes one (1).

13. An RF converter system as recited in claim 1, wherein the signal conversion circuit, the shifting circuit, and the termination circuit are stacked between supply rails.

14. An RF converter system as recited in claim 1, wherein a plurality of shifting circuits and termination circuits are included.

15. An RF converter system as recited in claim 14, wherein the signal conversion circuit, the shifting circuits, and the termination circuit are stacked between supply rails.

16. An RF converter system as recited in claim 1, wherein at least one of the circuits includes a folded circuit with passive current polarity reversing circuits facilitating current folding.

17. An RF converter system as in claim 16, wherein the passive current polarity reversing circuits possess a current gain of one (1) inclusive.

18. An RF converter system as recited in claim 1, wherein at least one of the circuits includes a folded circuit with active current polarity reversing circuits facilitating current folding.

19. An RF converter system as in claim 18, wherein the active current polarity reversing circuits possess a current gain of one (1) inclusive.

20. An RF converter system as recited in claim 1, wherein at least one of the circuits includes a low voltage standing wave ratio (VSWR) current input circuit.

21. An RF converter system as recited in claim 1, wherein at least one of the circuits includes a low headroom current input circuit.

22. An RF converter system as recited in claim 1, wherein at least one of the circuits includes a multiple input current mode circuit.

23. An RF converter system as recited in claim 1, wherein at least one of the circuits includes a voltage mode input circuit with conversion gain.

24. An RF converter system as recited in claim 1, wherein at least one of the circuits includes a multiple-mode circuit which operates in a voltage mode and a current mode simultaneously.

25. An RF converter system as recited in claim 1, and further comprising dual, phase adjustable, direct digital synthesis (DDS) devices, with phase adjustments offset 90 degrees; dual RF digital-to-analog devices (DACs), with at least 2 bits of resolution, that share a common frequency locking device; a common frequency locking circuit that has dual outputs to drive baseband DACs and DDS engines; and a common frequency locking circuit that has dual outputs to drive a local oscillator port of the RFDACs.

26. An RF converter system as recited in claim 1, and further comprising: 0 and 90 degree phase offset baseband digital engines driving respective RF digital-to-analog devices (DACs), that share a common zero (0) degree phase offset local oscillator driven frequency locking device; a common frequency locking circuit that has dual outputs to the RFDACs and digital engines; dual frequency locking circuits driven by 0 and 90 degree phase offset local oscillators, the 0 degree phase offset local oscillator driving the local oscillator port of the 0 degree phase offset baseband digital engine and RFDAC, and the 90 dgree phase offset local oscillator driving the local oscillator port of the 90 degree phase offset baseband digital engine and RFDAC; the RFDAC outputs summed to produce a phase cancelled, single sideband output.

27. An RF converter system as recited in claim 1, wherein the signal conversion circuit includes a digital-to-analog (DAC), and the shifting circuit shifts the analog signals.

28. An RF converter system as recited in claim 1, wherein the signal conversion circuit includes an analog-to-digital (ADC), and the shifting circuit shifts the digital signals.

29. An RF converter system as recited in claim 1, wherein the signal conversion circuit includes a digital signal processor (DSP), and the shifting circuit shifts the digital signals.

30. A RF converter system as recited in claim 1, wherein the signal conversion circuit and the shifting circuit are combined into a single unit separate from the termination circuit.

31. A RF converter system as recited in claim 1, wherein a frequency locking circuit ensures that the frequency associated with the oscillating signal, the frequency associated with the termination circuit, the frequency corresponding to the clock associated with the signal conversion circuit, and the frequency associated with the master clock are integer multiples of each other; and divide and/or multiply integer ratios of the frequency locking circuit and the termination circuit are changed so as to maintain integer frequency relationships.

32. A RF converter system as recited in claim 1, wherein the termination circuit is actively operated.

33. A RF converter system as recited in claim 1, wherein the termination circuit is passively operated.

34. An RF Converter system as recited in claim 1, wherein the termination circuit is a wire.

35. An RF converter system as recited in claim 1, wherein the oscillating signal associated with the shifting circuit and an input of the termination circuit have references that are offset with respect to each other.

36. A method for generating radio frequency (RF) signals, comprising:
    at least one of digitally processing and converting between digital signals and analog signals;
    at least one of frequency shifting and phase shifting at least one of the digital signals and analog signals, as a function of at least one of an oscillating signal and a baseband signal to generate modulated signals; and
    transmitting a portion of the modulated signals;
    wherein a frequency associated with the at least one of the oscillating signal and the baseband signal, a frequency associated with the output signal, a frequency corresponding to a clock signal associated with the converting, and a frequency associated with a master clock are integer multiples of each other.

37. A method as recited in claim 36, wherein a baseband spectrum of the converted signals is directly upconverted and split into sum and difference spectrums, centered around the oscillating signal and harmonics thereof.

38. A method as recited in claim 36, wherein a baseband fundamental and a first Nyquist zone of the converted signals are directly upconverted and split into sum and difference frequencies and spectrums, thereby being virtually amplified, centered adjacent to the oscillating signal and harmonics thereof.

39. A method as recited in claim 36, wherein aliases of the converted signals are directly upconverted and split into sum and difference frequencies, thereby being virtually amplified, centered around the oscillating signal and harmonics thereof.

40. A method as recited in claim 36, wherein aliases and a spectrum of the converted signals in close proximity to the oscillating signal and harmonics thereof are directly downconverted and upconverted and split into sum and difference spectrums, thereby being virtually attenuated, centered around a direct current (DC) of the oscillating signal and the harmonics thereof.

41. A method as recited in claim 36, wherein the output signal is filtered by a termination circuit that is frequency locked and bounded to the oscillating signal and a system sampling clock by the relationship: N*LO+Z*(Fs/2), where the LO includes the oscillating signal, Fs includes a frequency of a system sampling clock, the N, and Z are non-zero, independent integers.

42. A method as recited in claim 36, wherein the output signal is filtered by a termination circuit that is frequency locked and bounded to the oscillating signal and a system sampling clock by the relationship: N*LO−Z*(Fs/2), where the LO includes the oscillating signal, Fs includes a frequency of a system sampling clock; and the N, and Z are non-zero, independent integers.

43. A method as recited in claim 36, wherein the output signal is filtered by a termination circuit that is frequency locked and bounded to the oscillating signal and a system sampling clock by the relationship: [N*LO+Z*(Fs/2)]+[Z*(Fs/2)+Z*Fs], where the LO includes the oscillating signal, Fs includes a frequency of a system sampling clock; and the N, and Z are non-zero, independent integers.

44. A method as recited in claim 36, wherein the output signal is filtered by a termination circuit that is frequency locked and bounded to the oscillating signal and a system sampling clock by the relationship: N*LO−Z*(Fs/2)]−[Z*(Fs/2)−Z*Fs], where the LO includes the oscillating signal, Fs includes a frequency of a system sampling clock; and the N, and Z are non-zero, independent integers.

45. A method as recited in claim 36, and further comprising:
    tuning a dual direct digital synthesis (DDS) engine to a 90 degrees offset;
    tuning the DDS engine to a frequency that is ¼ a baseband digital-to-analog (DAC) clock (Fs) rate;
    tuning a RFDAC frequency locking device and a termination circuit to select a desired frequency output; and
    re-tuning the DDS engine to compensate for delay or phase inaccuracies in analog portions of the RFDAC.

46. A method as recited in claim 36, wherein the output signal is directly transmitted without frequency selection.

47. A radio frequency (RF) converter system for receiving RF signals, comprising:
    a signal conversion circuit for at least one of digital signal processing (DSP) and converting between digital signals and analog signals;
    a shifting circuit in communication with the signal conversion circuit for at least one of frequency shifting and phase shifting at least one of the digital signals and analog signals, as a function of at least one of an oscillating signal and a baseband signal to generate direct current signals;
    a port in communication with the output of the shifting circuit for communicating modulated signals; and
    a termination circuit in communication with the shifting circuit and the port, for receiving a portion of the direct current and the modulated signals;
    wherein a frequency associated with the at least one of the oscillating signal and the baseband signal, a frequency associated with the termination circuit, a frequency corresponding to a clock associated with the signal conversion circuit, and a frequency associated with a master clock are integer multiples of each other.

48. An RF converter system as recited in claim 47, wherein an output of the termination circuit is isolated from an input thereof.

49. An RF converter system as recited in claim 47, wherein a frequency locking circuit ensures that the frequency associated with the oscillating signal, the frequency associated with the termination circuit, the frequency corresponding to the clock associated with the signal conversion circuit, and the frequency associated with the master clock are integer multiples of each other.

50. An RF converter system as recited in claim 47, wherein an input of the termination circuit has a reference that is common with an input of the shifting circuit.

51. An RF converter system as recited in claim 47, wherein the shifting circuit is directly connected to the signal conversion circuit.

52. An RF converter system as recited in claim 47, wherein a polarity of a current from the signal conversion circuit is reversed to match a polarity of a current to the shifting circuit.

53. An RF converter system as recited in claim 47, wherein the oscillating signal associated with the shifting circuit and an input of the termination circuit have a reference that is common.

54. An RF converter system as recited in claim 53, wherein the reference is adjustable.

55. An RF converter system as recited in claim 47, wherein a DC biasing current flowing into the shifting circuit is adjustable, zero inclusive.

56. An RF converter system as recited in claim 47, wherein a DC biasing current flowing into the shifting circuit is set equal to a full scale current value of the signal conversion circuit.

57. An RF converter system as recited in claim 47, wherein the integer multiple is a less than one (1) such that the frequency associated with the oscillating signal, the frequency associated with the termination circuit, the frequency corresponding to the clock associated with the signal conversion circuit, and the frequency associated with the master clock are integer divisor of each other.

58. An RF converter system as recited in claim 47, wherein the integer multiple includes one (1).

59. An RF converter system as recited in claim 47, wherein the signal conversion circuit, the shifting circuit, and the termination circuit are stacked between supply rails.

60. An RF converter system as recited in claim 47, wherein at least one of the circuits includes a low voltage standing wave ratio (VSWR) current input circuit.

61. An RF converter system as recited in claim 47, wherein at least one of the circuits includes a low headroom current input circuit.

62. An RF converter system as recited in claim 47, wherein at least one of the circuits includes a multiple input current mode circuit.

63. An RF converter system as recited in claim 47, wherein at least one of the circuits includes a voltage mode input circuit with conversion gain.

64. An RF converter system as recited in claim 47, wherein at least one of the circuits includes a multiple-mode circuit which operates in a voltage mode and a current mode simultaneously.

65. An RF converter system as recited in claim 47, wherein the signal conversion circuit includes a digital-to-analog (DAC), and the shifting circuit shifts the analog signals.

66. A RF converter system as recited in claim 47, wherein the signal conversion circuit, the shifting circuit, and the termination circuit are combined into a single unit.

67. A RF converter system as recited in claim 47, wherein a frequency locking circuit ensures that the frequency associated with the oscillating signal, the frequency associated with the termination circuit, the frequency corresponding to the clock associated with the signal conversion circuit, and the frequency associated with the master clock are integer multiples of each other, and divide and/or multiply integer ratios of the frequency locking circuit and the termination circuit are changed so as to maintain integer frequency relationships.

68. A RF converter system as recited in claim 47, wherein the termination circuit is actively operated.

69. A RF converter system as recited in claim 47, wherein the termination circuit is passively operated.

70. An RF converter system as recited in claim 47, wherein the oscillating signal associated with the shifting circuit and an input of the termination circuit have references that are offset with respect to each other.

71. A method for receiving radio frequency (RF) signals, comprising:

receiving a non-varying direct current signal from a signal conversion circuit adapted for signal conversion, where the direct current signal serves to nullify an oscillating signal applied to a shifting circuit and provide biasing for a termination circuit; and combining the non-varying direct current signal with incoming modulated signals from a transmit/receive port for application to the termination circuit, where the termination circuit is adapted for generating baseband signals as a function of the oscillating signal;

wherein a frequency associated with the at least one of the oscillating signal and the baseband signals, a frequency associated with an output signal, a frequency corresponding to a clock signal associated with the signal conversion, and a frequency associated with a master clock signal are integer multiples of each other.

* * * * *